US012699729B1

(12) United States Patent
Mussmann et al.

(10) Patent No.: US 12,699,729 B1
(45) Date of Patent: Aug. 4, 2026

(54) IMAGE SEARCH USING VECTORS

(71) Applicant: Coactive Systems Inc., San Jose, CA (US)

(72) Inventors: Stephen Oscar Mussmann, Fremont, CA (US); Seby Jacob, Montreal (CA)

(73) Assignee: Coactive Systems Inc., San Jose, CA (US)

( * ) Notice: Subject to any disclaimer, the term of this patent is extended or adjusted under 35 U.S.C. 154(b) by 0 days.

(21) Appl. No.: 19/093,047

(22) Filed: Mar. 27, 2025

Related U.S. Application Data

(60) Provisional application No. 63/656,929, filed on Jun. 6, 2024.

(51) Int. Cl.
| | |
|---|---|
| *G06F 16/53* | (2019.01) |
| *G06F 16/535* | (2019.01) |
| *G06F 16/538* | (2019.01) |

(52) U.S. Cl.
CPC .......... *G06F 16/535* (2019.01); *G06F 16/538* (2019.01)

(58) Field of Classification Search
None
See application file for complete search history.

(56) References Cited

U.S. PATENT DOCUMENTS

| | | | |
|---|---|---|---|
| 7,437,349 | B2 | 10/2008 | Basu et al. |
| 7,493,340 | B2 | 2/2009 | Rui |
| 7,529,732 | B2 | 5/2009 | Liu et al. |
| 8,209,347 | B1 | 6/2012 | Sahami et al. |
| 8,843,478 | B1 | 9/2014 | Jing et al. |
| 9,098,584 | B1 * | 8/2015 | Fredinburg ........... G06F 16/532 |
| 10,503,775 | B1 | 12/2019 | Ranzinger et al. |
| 2010/0332474 | A1 * | 12/2010 | Birdwell ............ G06Q 30/0185 |
| | | | 707/E17.089 |

(Continued)

FOREIGN PATENT DOCUMENTS

| | | |
|---|---|---|
| CN | 118132791 A | 6/2024 |
| WO | 2021098585 A1 | 5/2021 |
| WO | 2023101679 A1 | 6/2023 |

OTHER PUBLICATIONS

Hong et al., Query Expansion by Text and Image Features in Image Retrieval, ScienceDirect Journal of Visual Communication and Image Representation, vol. 9, Issue 4, Dec. 1998, pp. 287-299, 4 pp.

(Continued)

*Primary Examiner* — Eliyah S. Harper
(74) *Attorney, Agent, or Firm* — Young Basile Hanlon & MacFarlane, P.C.

(57) ABSTRACT

A server receives, from a client device, an image search query comprising multiple search components. The server maps each of the multiple search components to a component embedding vector to generate multiple component embedding vectors. The server mathematically combines the multiple component embedding vectors to generate multiple query vectors with different mathematical combinations. The server identifies, for each of the different mathematical combinations, from a vector database storing representations of images, a set of image search results based on a similarity score of a query vector of the multiple query vectors and an image embedding vector for an image of the images. The server transmits, to the client device, a portion of the set of image search results.

20 Claims, 19 Drawing Sheets

(56)                    References Cited

U.S. PATENT DOCUMENTS

| | | | |
|---|---|---|---|
| 2010/0332475 A1* | 12/2010 | Birdwell | G06F 18/2323 |
| | | | 707/E17.014 |
| 2015/0120720 A1 | 4/2015 | Dhara | |
| 2018/0232451 A1 | 8/2018 | Lev-Tov et al. | |
| 2018/0268015 A1* | 9/2018 | Sugaberry | G06F 16/2365 |
| 2021/0224312 A1* | 7/2021 | Harikumar | G06F 16/532 |
| 2021/0271707 A1* | 9/2021 | Lin | G06V 30/274 |
| 2022/0036197 A1 | 2/2022 | Strope et al. | |
| 2022/0164380 A1* | 5/2022 | Lin | G06N 3/0475 |
| 2022/0342928 A1* | 10/2022 | Flagg | G06V 10/761 |
| 2023/0137774 A1* | 5/2023 | Faieta | G06F 16/5854 |
| | | | 382/305 |
| 2023/0353828 A1* | 11/2023 | Wang | G06V 10/774 |
| 2024/0356967 A1* | 10/2024 | Costa | H04L 63/1483 |
| 2025/0190575 A1* | 6/2025 | Kirat | G06F 21/577 |
| 2025/0298840 A1* | 9/2025 | Gong | G06F 16/538 |
| 2025/0308223 A1* | 10/2025 | Lim | G06V 10/141 |
| 2026/0010773 A1* | 1/2026 | Fortkort | G06N 3/0475 |

OTHER PUBLICATIONS

Jegou, et al., Faiss: A Library for Efficient Similarity Search, Engineering at Meta, Mar. 29, 2017, 12 pp.
Marks, Jacob, Finding Images with Words, Voxel51, Jan. 11, 2023, 23 pp.
Tabach, Roi, Implementing Semantic Image Search with Amazon OpenSearch Service, BigData Boutique Blog, Sep. 28, 2024, 11 pp.
Vector Search Release Notes, Google Cloud, last updated Mar. 17, 2025, 14 pp.
Park et al., Image Search with Natural Language Queries, Google Cloud, Aug. 2, 2021, 31 pp.
Pillai, Prasanna Venkatesh, How We Built a Lightning-Fast Image Search Engine, Jun. 7, 2024, 5 pp.
Semantic Text and Image Search with AI & Vector Databases, Monin Database Managed Services, Jun. 15, 9 pp.
Clark, Jess N., "Context Is All You Need"—Multimodal Vector Search with Personalization, Marquo Showcase, Jun. 8, 2023, 18 pp.
The Tenyks Blogger, Multi-Modal Image Search with Embeddings & Vector DBs, Tenyks Platform, Aug. 28, 2023, 16 pp.
Smith, Mark, Build an Image Search Engine with Python & MongoDB, MonboDB Developer, last updated Sep. 18, 2024, 16 pp.
Sopar, Simun, Search Beyond the Words: AI Vector Search vs Traditional Text-Based Search, Velebit AI, Jun. 5, 2024, 17 pp.
Solbakken, Lester, Text-to-Image Search with Vespa, Vespa Blog: We Make AI Work, Nov. 28, 2021, 7 pp.
Create a Vector Query in Azure AI Search, Microsoft, Mar. 11, 2025, 13 pp.
International Search Report and Written Opinion for PCT Patent Application No. PCT/US2025/021971 dated Jun. 18, 2025, 9 pp.

* cited by examiner

Figure 8:
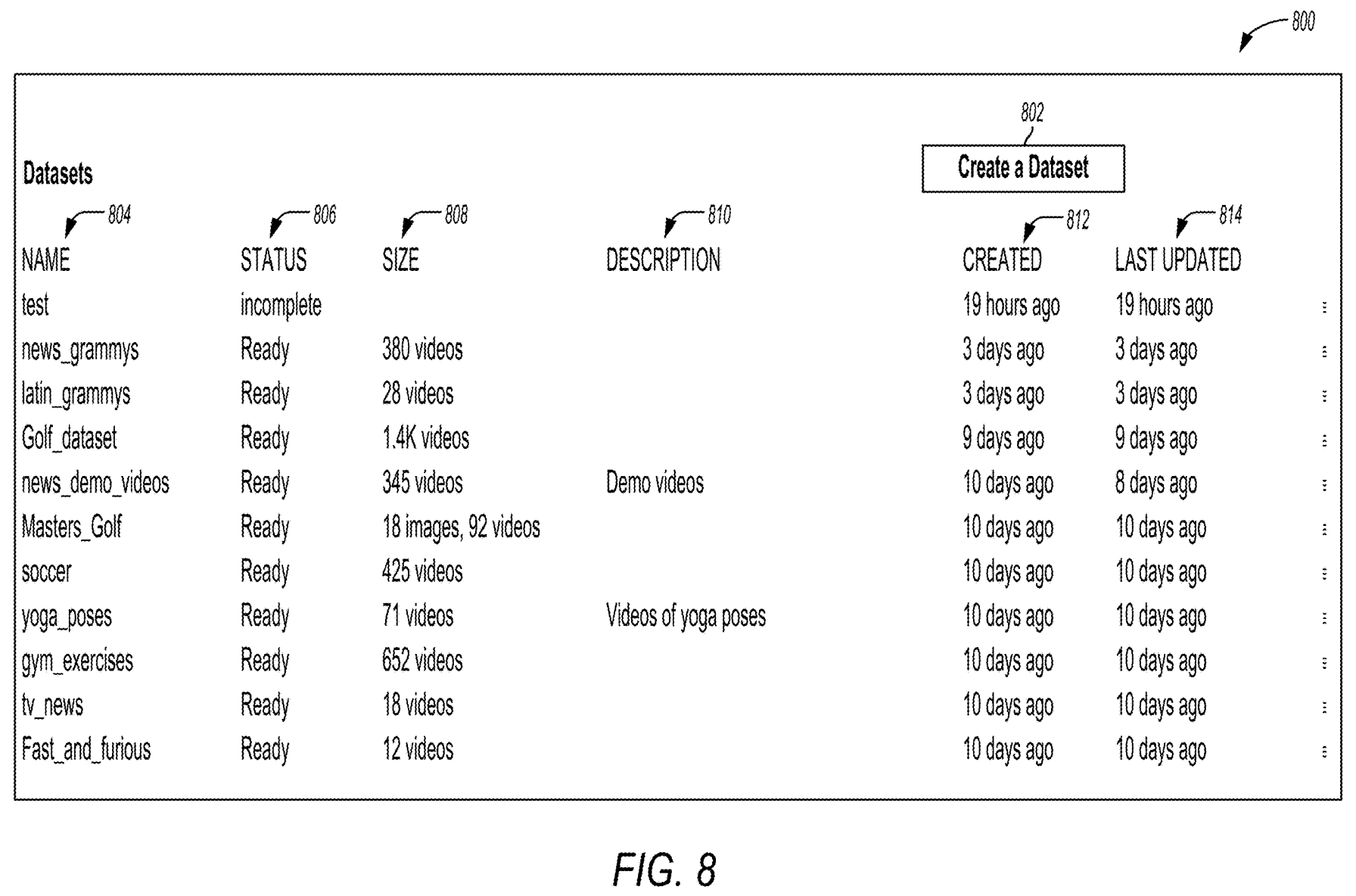

Create a Dataset

Datasets

| NAME (804) | STATUS (806) | SIZE (808) | DESCRIPTION (810) | CREATED (812) | LAST UPDATED (814) |
|---|---|---|---|---|---|
| test | incomplete | | | 19 hours ago | 19 hours ago |
| news_grammys | Ready | 380 videos | | 3 days ago | 3 days ago |
| latin_grammys | Ready | 28 videos | | 3 days ago | 3 days ago |
| Golf_dataset | Ready | 1.4K videos | | 9 days ago | 9 days ago |
| news_demo_videos | Ready | 345 videos | Demo videos | 10 days ago | 8 days ago |
| Masters_Golf | Ready | 18 images, 92 videos | | 10 days ago | 10 days ago |
| soccer | Ready | 425 videos | | 10 days ago | 10 days ago |
| yoga_poses | Ready | 71 videos | Videos of yoga poses | 10 days ago | 10 days ago |
| gym_exercises | Ready | 652 videos | | 10 days ago | 10 days ago |
| tv_news | Ready | 18 videos | | 10 days ago | 10 days ago |
| Fast_and_furious | Ready | 12 videos | | 10 days ago | 10 days ago |

| | Princess | War Zone | Elephant |
|---|---|---|---|
| Video_ABC.mov Frame 00:12:34.25 | 1 | 0 | 0 |
| Video_ABC.mov FRAME 00:56:12.75 | 0 | 1 | 0 |
| Image_DEF.jpg | 1 | 0 | 1 |
| Image_GHI.jpg | 0 | 1 | 0 |

1200B

| | Princess | War Zone | Elephant |
|---|---|---|---|
| Video_ABC.mov Frame 00:12:34.25 | 0.97 | 0.02 | 0.01 |
| Video_ABC.mov FRAME 00:56:12.75 | 0.01 | 0.95 | 0.02 |
| Image_DEF.jpg | 0.93 | 0.01 | 0.98 |
| Image_GHI.jpg | 0.02 | 0.96 | 0.01 |

EMBEDDING-BASED CLASSIFIER & METADATA SEARCH:

EMBEDDING-BASED CLASSIFIER & METADATA SEARCH:

*1600*

Client Device ⎯ *1602*

Image Search Query ⎯ *1608*

Search Components ⎯ *1610*

*1612*
Server ⎯ *1604*

*1614*

Query Vectors

Image Search Results

Vector Database ⎯ *1606*

*1616*

Image Representations

*1700*

Image Search Query *1702*

*1704*

Boolean Filtering Criteria

*1706* Probabilistic Search Criteria

Relational Database *1708*

N Filtering Search Results *1710*

N<T *1712*

Apply Probabilistic Search Criteria To N Filtering Search Results *1714*

N>T *1716*

Vector Database *1718*

M Probabilistic Search Results *1720*

Filter M Probabilistic Search Results According to Boolean Filtering Criteria *1722*

1900

Receive an image search query compromising search components — 1902

Map the search components to component embedding vectors — 1904

Combine the component embedding vectors to generate query vectors — 1906

Identify image search results using query vectors — 1908

IMAGE SEARCH USING VECTORS

PRIORITY CLAIM

This application claims the benefit of U.S. Provisional Patent Application No. 63/656,929, filed on Jun. 6, 2024, titled "IMAGE SEARCH USING VECTORS," the entire disclosure of which is incorporated herein by reference.

TECHNICAL FIELD

Embodiments pertain to search techniques. Some embodiments relate to vector-based search techniques, for example, in the context of image search.

BACKGROUND

Techniques exist for searching text files and databases including text based on text inputs. However, searching for images matching a query in an image database may be more challenging, as the content of an image is more challenging to determine using computerized techniques. Techniques for image search are desirable.

BRIEF DESCRIPTION OF THE DRAWINGS

FIG. 3 illustrates the training of an image recognition machine learning program, in accordance with some embodiments.

FIG. 8 illustrates an example graphical user interface for displaying datasets, in accordance with some embodiments.

DETAILED DESCRIPTION

Figure 1:
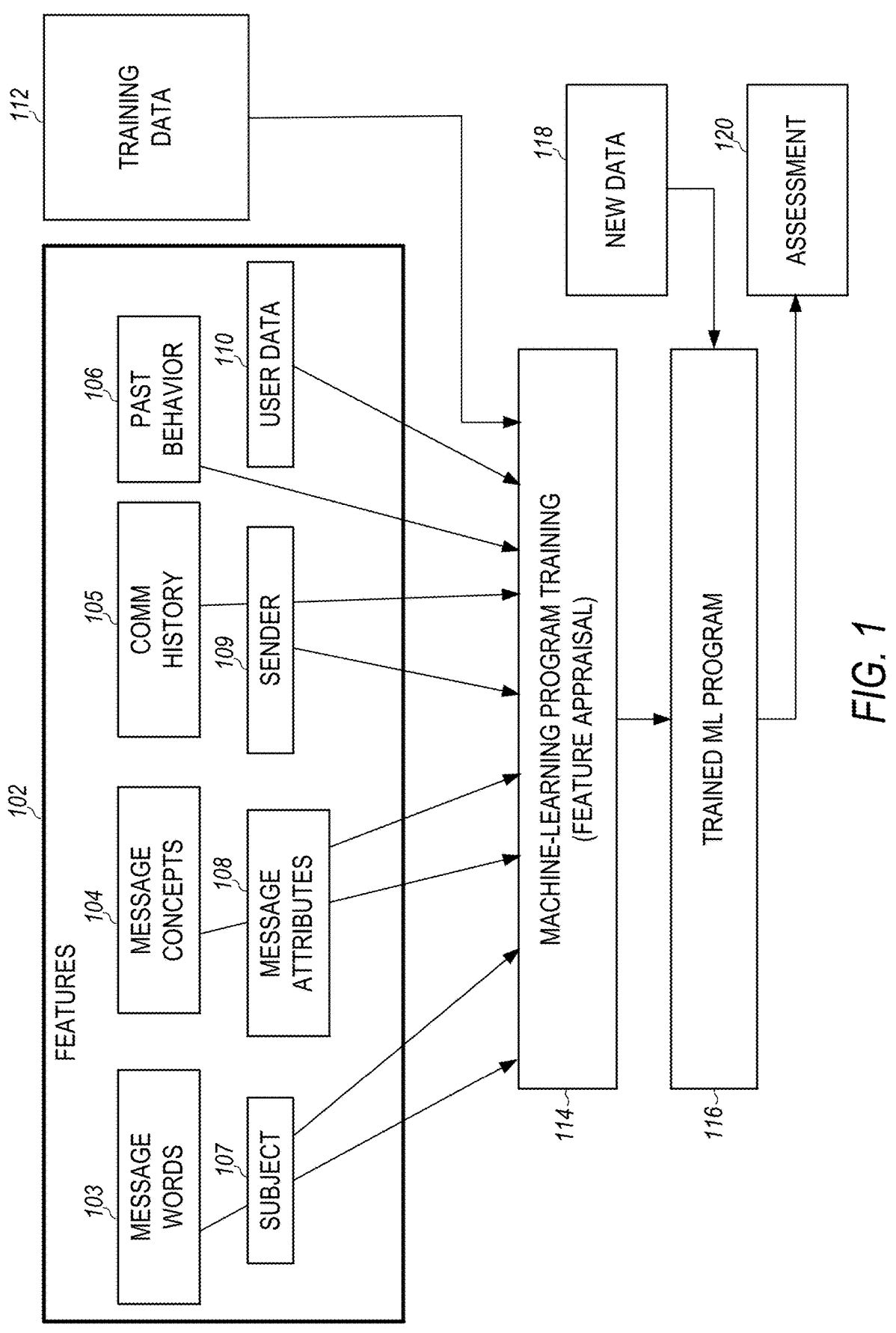
FIG. 1 illustrates the training and use of a machine-learning program, in accordance with some embodiments.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

According to some schemes, training an image classification engine is a cumbersome process. For example, to train an image classification engine to classify images as "elephant" or "not elephant" may require human users to manually identify and provide thousands of positive example images of "elephant" and negative example images of "not elephant." This is a cumbersome process that may be prohibitively expensive (in terms of human labor costs) for some classification tasks.

Some implementations disclosed herein address the above problems by using embeddings to identify similar images, and training the image classification engine using the embeddings of some images. An embedding may be any logical or mathematical representation of content of an image. In some cases, an embedding of an image includes a result of a mathematical function of the image that transforms the image into a vector. The mathematical function may be applied to a modified or augmented version of the image (e.g., resizing, rotation, cropping, flipping, gray-scaling, color modification, sharpness adjustment, contrast adjustment, brightness adjustment, or other vision transforms applied to the image). The vector may be a multi-dimensional vector in an embedding space. As used herein, the term "embedding space" may include, among other things, a multi-dimensional space that includes embeddings of multiple images, some embeddings for some images, or all embeddings of all images. The embedding space may include many dimensions (e.g., 500 dimensions) and vectors in the embedding space may be sparse (e.g., an embedding corresponding to an image may include 450 zero values (of dimensions of the vector) and 50 values (of dimensions of the vector) that are not zero). As used herein, the term "vector" may include, among other things, a single or multi-dimensional array of numbers.

A server obtains a set of images from a data repository. For example, an owner of a data repository or a set of images therein may grant permission to the server to access the set of images. The server receives an input representing a first subset of images from the set of images that meet classification criteria (e.g., are positive examples of "elephant"). The first subset of images may include, for example, three or fewer images, five or fewer images, ten or fewer images, 30 or fewer images, 100 or fewer images, or another number of images. The server identifies, based on the first subset, a second subset of images from the set of images that do not meet the classification criteria (e.g., are negative examples of "elephant"). The first subset and/or the second subset of images may be identified manually by the user of the client device. Alternatively, the second subset of images may include images, from the set, that include embeddings having a threshold distance (e.g., Euclidean distance in a multi-dimensional embedding space) from the embeddings of the images in the first subset. In some cases, a combination of manual and computerized identification of the first subset and/or the second subset of images may be used. For example, a human (e.g., via a GUI displayed at a client device) may verify that the images identified by the server for the second subset do not meet the classification criteria. As used herein, the term "subset" may reference, among other things, some or all of the members of a set. For example, if a set includes {A, B, C}, (where A, B, and C are members of the set) subsets of this set may be: empty set, {A}, {B}, {C}, {A, B}, {A, C}, {B, C}, or {A, B, C}. In some cases, a subset may include one or more members.

The server trains, using training data including the first subset and the second subset, an image classification engine to classify images according to the classification criteria. Training the image classification engine uses embeddings of the first subset of images and embeddings of the second subset of images to train the image classification engine to identify images corresponding to the classification criteria based on the embeddings of the images. In some implementations, the image classification engine is trained by identifying, by the image classification engine, a collection of images from the set of images. The collection may include one or more members of the set. Images in the collection of images have a score for meeting the classification criteria within an uncertainty range (e.g., between 30% and 70% or between 20% and 80%). The server transmits image(s) from the collection to the client device for review by the user of the client device. The server receives, from the client device, an indication whether the image(s) meet the classification criteria. The server further trains the image classification engine based on the received indication. In some cases, this process may be repeated, recursively, multiple times, with multiple different collections. As a result, the image classification engine is able to learn the correct classification of "hard" examples of which the image classification engine is uncertain, to improve its classification performance. After the training is completed, the server outputs a signal that the image classification engine is trained.

It should be noted that the images in the set of images may lack tags. (Alternatively, all or a portion of the images in the set may have pre-existing tags or the tags may be generated using the disclosed technology, for example, as described below.) The image classification engine may be trained using the embeddings. Furthermore, an entity associated with the server or the data repository may reduce costs in tagging the images (e.g., manually or using other software).

Some implementations relate to techniques for structuring image data. A server obtains a set of images from a data repository. The server generates embeddings for the set of images. The server obtains, using an image classification engine, tags for at least a portion of the images. The tags may correspond to natural language (e.g., English, Spanish, Chinese, or another language that developed naturally in human communities for human communication) descriptions of what is depicted in the image (e.g., "princess" or "elephant") or some information about the image (e.g., whether the image is a line drawing, a painting, or a photograph). The server generates a matrix. A first dimension of the matrix identifies an image from the set of images. A second dimension of the matrix identifies a tag. A cell in the matrix includes a value associated with the image of the first dimension of the cell having the tag of the second dimension of the cell. This is useful, for example, in identifying images associated with negative examples of a classification. As a result of development of this matrix, queries (e.g., structured queries using SQL or natural language search) may be run on the matrix (e.g., against unstructured image or video data). Furthermore, the matrix may be used to determine responses to queries. In addition, the matrix may be manipulated (e.g., merged) with other tables to generate a new table. Queries may then be performed against the new table. The new table may be stored at the server or in a data repository. In an example use case of the disclosed technology, a warehouse of automobile parts stores, in a database, a table of inventory storing the part number of each part and a number of items of the part number that are in the warehouse. When a truck arrives at the warehouse, an employee takes a photograph of all of the parts on the truck using their mobile phone, and the photographs are used to generate a matrix, using the techniques described herein. The generated table may be used to determine which parts were brought by the truck and how many of each part were brought. Furthermore, the generated matrix could be merged with the table in the database.

Some implementations relate to multimodal search. The multimodal search may receive as input text or imagery and provide as output imagery (e.g., photographs or frames from videos). The input text may be converted to embeddings, and the input imagery may be converted to embeddings. The search results may correspond to imagery from the data repository that is proximate (e.g., in a multidimensional space) to the embeddings of the input.

Some implementations relate to visual search with a text input. For example, the text "elephant" may be used to search a data repository of images. The output of the search may be configured (e.g., via a GUI) to include at least one of images, videos, or video frames.

Some implementations relate to audio search with a text input. The input may be a text (e.g., "apartment building") that corresponds to speech in a video. The output may be videos that include audio corresponding to the input text.

Some implementations relate to embedding-based classifier/metadata search. In the input, a user specifies whether any or all of the filter conditions that are searched for should be included in the results. The user then specifies the filter conditions based on embedding-based classifiers or metadata of the images or videos that are searched. Filter conditions may use embedding-based classifiers to determine whether an image is to be included in the search results. Examples of filter conditions based on embedding-based classifiers include: "woman is positive," "cat is positive," and "man is negative." Examples of filter conditions based on metadata include: "identifier number is not 5," "created date/time is before Jan. 1, 2020," and "filetype is not JPG." As used herein, an embedding-based classifier includes, among other things, a data structure that represents a region of the embedding space. The embedding-based classifier may include images that share similar characteristics or features (which could be described in natural language). In a simple example, imagine that the embedding space corresponds to a three-dimensional space with (x, y, z) coordinates. Black-and-white photographs are mapped to an embedding-based classifier where x is 0, y is between 0.1 and 0.3, and z is between 0.5 and 0.7. Other embedding-based classifiers could be defined for other characteristics or features of images, such as "man," "woman," "cat," "line drawing," and "Impressionist painting."

One example of an embedding-based classifier/metadata search includes the following string: "[match: all] [woman is positive] [created date in range 1 Jan. 2019 to 31 Dec. 2019]". The output of this search would be images or videos that include a woman and are created in the year 2019. In this example, a first embedding-based classifier would iden-tify images of a woman, and a second embedding-based classifier would identify images created in 2019. Another example of an embedding-based classifier/metadata search includes the following string: "[match: any] [cat is positive] [created date in range 1 Mar. 2023 to 31 Mar. 2023]." The output of this search would include images or videos that either include a cat (and are created at any time) or are created in March 2023 (regardless of whether they include a cat).

Some examples of the disclosed technology are described as processing images. However, the disclosed technology could be used to process audio and/or combinations of images and audio (e.g., in video). For example, the disclosed technology could map audio files to the embedding space based on features of the audio files (e.g., at least one of male voice, female voice, lecture, conversation, music, or animal sounds).

Aspects of the present technology may be implemented as part of a computer system. The computer system may be one physical machine, or may be distributed among multiple physical machines, such as by role or function, or by process thread in the case of a cloud computing distributed model. In various embodiments, aspects of the technology may be configured to run in virtual machines that in turn are executed on one or more physical machines. It will be understood by persons of skill in the art that features of the technology may be realized by a variety of different suitable machine implementations.

The system includes various engines, each of which is constructed, programmed, configured, or otherwise adapted, to carry out a function or set of functions. The term engine as used herein means a tangible device, component, or arrangement of components implemented using hardware, such as by an application specific integrated circuit (ASIC) or field-programmable gate array (FPGA), for example, or as a combination of hardware and software, such as by a processor-based computing platform and a set of program instructions that transform the computing platform into a special-purpose device to implement the particular function-ality. An engine may also be implemented as a combination of the two, with certain functions facilitated by hardware alone, and other functions facilitated by a combination of hardware and software.

In an example, the software may reside in executable or non-executable form on a tangible machine-readable storage medium. Software residing in non-executable form may be compiled, translated, or otherwise converted to an execut-able form prior to, or during, runtime. In an example, the software, when executed by the underlying hardware of the engine, causes the hardware to perform the specified opera-tions. Accordingly, an engine is physically constructed, or specifically configured (e.g., hardwired), or temporarily con-figured (e.g., programmed) to operate in a specified manner or to perform part or all of any operations described herein in connection with that engine.

Considering examples in which engines are temporarily configured, each of the engines may be instantiated at different moments in time. For example, where the engines comprise a general-purpose hardware processor core con-figured using software, the general-purpose hardware pro-cessor core may be configured as respective different engines at different times. Software may accordingly con-figure a hardware processor core, for example, to constitute a particular engine at one instance of time and to constitute a different engine at a different instance of time.

In certain implementations, at least a portion, and in some cases, all, of an engine may be executed on the processor(s) of one or more computers that execute an operating system, system programs, and application programs, while also implementing the engine using multitasking, multithreading, distributed (e.g., cluster, peer-peer, cloud, etc.) processing where appropriate, or other such techniques. Accordingly, each engine may be realized in a variety of suitable con-figurations, and should generally not be limited to any particular implementation exemplified herein, unless such limitations are expressly called out.

In addition, an engine may itself be composed of more than one sub-engines, each of which may be regarded as an engine in its own right. Moreover, in the embodiments described herein, each of the various engines corresponds to a defined functionality; however, it should be understood that in other contemplated embodiments, each functionality may be distributed to more than one engine. Likewise, in other contemplated embodiments, multiple defined func-tionalities may be implemented by a single engine that performs those multiple functions, possibly alongside other functions, or distributed differently among a set of engines than specifically illustrated in the examples herein.

As used herein, the term "model" encompasses its plain and ordinary meaning. A model may include, among other things, one or more engines which receive an input and compute an output based on the input. The output may be a classification. For example, an image file may be classified as depicting a cat or not depicting a cat. Alternatively, the image file may be assigned a numeric score indicating a likelihood whether the image file depicts the cat, and image files with a score exceeding a threshold (e.g., 0.9 or 0.95) may be determined to depict the cat.

This document may reference a specific number of things (e.g., "six mobile devices"). Unless explicitly set forth otherwise, the numbers provided are examples only and may be replaced with any positive integer, integer or real number, as would make sense for a given situation. For example, "six mobile devices" may, in alternative embodiments, include any positive integer number of mobile devices. Unless otherwise mentioned, an object referred to in singular form (e.g., "a computer" or "the computer") may include one or multiple objects (e.g., "the computer" may refer to one or multiple computers).

FIG. 1 illustrates the training and use of a machine-learning program, according to some example embodiments. In some example embodiments, machine-learning programs (MLPs), also referred to as machine-learning algorithms or tools, are utilized to perform operations associated with machine learning tasks, such as image recognition or machine translation.

Machine learning is a field of study that gives computers the ability to perform certain tasks without being explicitly programmed to perform those tasks. In traditional comput-ing, a programmer would encode instructions (e.g., to solve a quadratic equation using the quadratic formula), and the computer would perform those exact instructions. In con-trast, in machine learning, a computer could be provided with examples of images of elephants and be trained to determine which images have and lack depictions of elephants, without the programmer encoding explicit instructions as to how to identify an elephant. Machine learning explores the study and construction of algorithms, also referred to herein as tools, which may learn from existing data and make predictions about new data. Such machine-learning tools operate by building a model from example training data 112 in order to make data-driven predictions or decisions expressed as outputs or assessments 120. Although example embodiments are presented with respect to a few machine-learning tools, the principles presented herein may be applied to other machine-learning tools.

In some example embodiments, different machine-learning tools may be used. For example, Logistic Regression (LR), Naive-Bayes, Random Forest (RF), neural networks (NN), matrix factorization, and Support Vector Machines (SVM) tools may be used for classifying or scoring job postings.

Two common types of problems in machine learning are classification problems and regression problems. Classification problems, also referred to as categorization problems, aim at classifying items into one of several category values (for example, is this object an apple or an orange). Regression algorithms aim at quantifying some items (for example, by providing a value that is a real number). The machine-learning algorithms utilize the training data 112 to find correlations among identified features 102 that affect the outcome.

The machine-learning algorithms utilize features 102 for analyzing the data to generate assessments 120. A feature 102 is an individual measurable property of a phenomenon being observed. The concept of a feature is related to that of an explanatory variable used in statistical techniques such as linear regression. Choosing informative, discriminating, and independent features is important for effective operation of the MLP in pattern recognition, classification, and regression. Features may be of different types, such as numeric features, strings, and graphs.

In one example embodiment, the features 102 may be of different types and may include one or more of words of the message 103, message concepts 104, communication history 105, past user behavior 106, subject of the message 107, other message attributes 108, sender 109, and user data 110.

The machine-learning algorithms utilize the training data 112 to find correlations among the identified features 102 that affect the outcome or assessment 120. In some example embodiments, the training data 112 includes labeled data, which is known data for one or more identified features 102 and one or more outcomes, such as detecting communication patterns, detecting the meaning of the message, generating a summary of the message, detecting action items in the message, detecting urgency in the message, detecting a relationship of the user to the sender, calculating score attributes, calculating message scores, etc.

With the training data 112 and the identified features 102, the machine-learning tool is trained at operation 114. The machine-learning tool appraises the value of the features 102 as they correlate to the training data 112. The result of the training is the trained machine-learning program 116.

When the machine-learning program 116 is used to perform an assessment, new data 118 is provided as an input to the trained machine-learning program 116, and the machine-learning program 116 generates the assessment 120 as output. For example, when a message is checked for an action item, the machine-learning program utilizes the message content and message metadata to determine if there is a request for an action in the message.

Machine learning techniques train models to accurately make predictions on data fed into the models (e.g., what was said by a user in a given utterance; whether a noun is a person, place, or thing; what the weather will be like tomorrow). During a learning phase, the models are developed against a training dataset of inputs to optimize the models to correctly predict the output for a given input. Generally, the learning phase may be supervised, semi-supervised, or unsupervised; indicating a decreasing level to which the "correct" outputs are provided in correspondence to the training inputs. In a supervised learning phase, all of the outputs are provided to the model and the model is directed to develop a general rule or algorithm that maps the input to the output. In contrast, in an unsupervised learning phase, the desired output is not provided for the inputs so that the model may develop its own rules to discover relationships within the training dataset. In a semi-supervised learning phase, an incompletely labeled training set is provided, with some of the outputs known and some unknown for the training dataset.

Models may be run against a training dataset for several epochs (e.g., iterations), in which the training dataset is repeatedly fed into the model to refine its results. For example, in a supervised learning phase, a model is developed to predict the output for a given set of inputs, and is evaluated over several epochs to more reliably provide the output that is specified as corresponding to the given input for the greatest number of inputs for the training dataset. In another example, for an unsupervised learning phase, a model is developed to cluster the dataset into n groups, and is evaluated over several epochs as to how consistently it places a given input into a given group and how reliably it produces the n desired clusters across each epoch.

Once an epoch is run, the models are evaluated and the values of their variables are adjusted to attempt to better refine the model in an iterative fashion. In various aspects, the evaluations are biased against false negatives, biased against false positives, or evenly biased with respect to the overall accuracy of the model. The values may be adjusted in several ways depending on the machine learning technique used. For example, in a genetic or evolutionary algorithm, the values for the models that are most successful in predicting the desired outputs are used to develop values for models to use during the subsequent epoch, which may include random variation/mutation to provide additional data points. One of ordinary skill in the art will be familiar with several other machine learning algorithms that may be applied with the present disclosure, including linear regression, random forests, decision tree learning, neural networks, deep neural networks, etc.

Each model develops a rule or algorithm over several epochs by varying the values of one or more variables affecting the inputs to more closely map to a desired result, but as the training dataset may be varied, and is preferably very large, perfect accuracy and precision may not be achievable. A number of epochs that make up a learning phase, therefore, may be set as a given number of trials or a fixed time/computing budget, or may be terminated before that number/budget is reached when the accuracy of a given model is high enough or low enough or an accuracy plateau has been reached. For example, if the training phase is designed to run n epochs and produce a model with at least 95% accuracy, and such a model is produced before the $n^{th}$ epoch, the learning phase may end early and use the produced model satisfying the end-goal accuracy threshold.

Similarly, if a given model is inaccurate enough to satisfy a random chance threshold (e.g., the model is only 55% accurate in determining true/false outputs for given inputs), the learning phase for that model may be terminated early, although other models in the learning phase may continue training. Similarly, when a given model continues to provide similar accuracy or vacillate in its results across multiple epochs-having reached a performance plateau—the learning phase for the given model may terminate before the epoch number/computing budget is reached.

Once the learning phase is complete, the models are finalized. In some example embodiments, models that are finalized are evaluated against testing criteria. In a first example, a testing dataset that includes known outputs for its inputs is fed into the finalized models to determine an accuracy of the model in handling data that it has not been trained on. In a second example, a false positive rate or false negative rate may be used to evaluate the models after finalization. In a third example, a delineation between data clusterings is used to select a model that produces the clearest bounds for its clusters of data.

Figure 2:
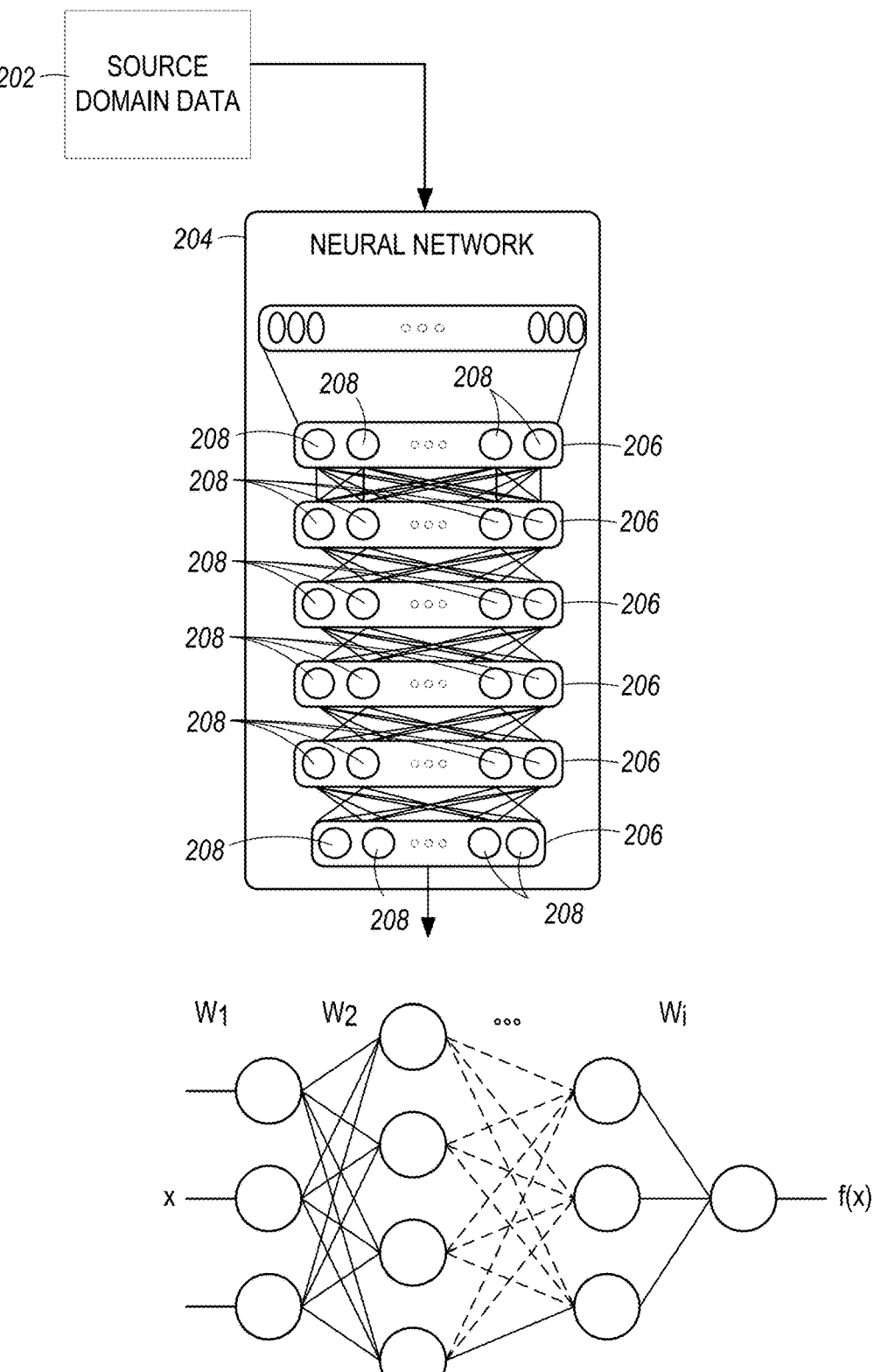
FIG. 2 illustrates an example neural network, in accordance with some embodiments.

FIG. 2 illustrates an example neural network 204, in accordance with some embodiments. As shown, the neural network 204 receives, as input, source domain data 202. The input is passed through a plurality of layers 206 to arrive at an output. Each layer 206 includes multiple neurons 208. The neurons 208 receive input from neurons of a previous layer and apply weights to the values received from those neurons in order to generate a neuron output. The neuron outputs from the final layer 206 are combined to generate the output of the neural network 204.

As illustrated at the bottom of FIG. 2, the input is a vector x. The input is passed through multiple layers 206, where weights $W_1$, $W_2$, . . . , $W_i$ are applied to the input to each layer to arrive at $f^1(x)$, $f^2(x)$, . . . , $f^{i-1}(x)$, until finally the output f(x) is computed.

In some example embodiments, the neural network 204 (e.g., deep learning, deep convolutional, or recurrent neural network) comprises a series of neurons 208, such as Long Short Term Memory (LSTM) nodes, arranged into a network. A neuron 208 is an architectural element used in data processing and artificial intelligence, particularly machine learning, which includes memory that may determine when to "remember" and when to "forget" values held in that memory based on the weights of inputs provided to the given neuron 208. Each of the neurons 208 used herein are configured to accept a predefined number of inputs from other neurons 208 in the neural network 204 to provide relational and sub-relational outputs for the content of the frames being analyzed. Individual neurons 208 may be chained together and/or organized into tree structures in various configurations of neural networks to provide interactions and relationship learning modeling for how each of the frames in an utterance are related to one another.

For example, an LSTM node serving as a neuron includes several gates to handle input vectors (e.g., phonemes from an utterance), a memory cell, and an output vector (e.g., contextual representation). The input gate and output gate control the information flowing into and out of the memory cell, respectively, whereas forget gates optionally remove information from the memory cell based on the inputs from linked cells earlier in the neural network. Weights and bias vectors for the various gates are adjusted over the course of a training phase, and once the training phase is complete, those weights and biases are finalized for normal operation. One of skill in the art will appreciate that neurons and neural networks may be constructed programmatically (e.g., via software instructions) or via specialized hardware linking each neuron to form the neural network.

Neural networks utilize features for analyzing the data to generate assessments (e.g., recognize units of speech). A feature is an individual measurable property of a phenomenon being observed. The concept of feature is related to that of an explanatory variable used in statistical techniques such as linear regression. Further, deep features represent the output of nodes in hidden layers of the deep neural network.

A neural network, sometimes referred to as an artificial neural network, is a computing system/apparatus based on consideration of biological neural networks of animal brains. Such systems/apparatus progressively improve performance, which is referred to as learning, to perform tasks, typically without task-specific programming. For example, in image recognition, a neural network may be taught to identify images that contain an object by analyzing example images that have been tagged with a name for the object and, having learnt the object and name, may use the analytic results to identify the object in untagged images. A neural network is based on a collection of connected units called neurons, where each connection, called a synapse, between neurons can transmit a unidirectional signal with an activating strength that varies with the strength of the connection. The receiving neuron can activate and propagate a signal to downstream neurons connected to it, typically based on whether the combined incoming signals, which are from potentially many transmitting neurons, are of sufficient strength, where strength is a parameter.

A deep neural network (DNN) is a stacked neural network, which is composed of multiple layers. The layers are composed of nodes, which are locations where computation occurs, loosely patterned on a neuron in the human brain, which fires when it encounters sufficient stimuli. A node combines input from the data with a set of coefficients, or weights, that either amplify or dampen that input, which assigns significance to inputs for the task the algorithm is trying to learn. These input-weight products are summed, and the sum is passed through what is called a node's activation function, to determine whether and to what extent that signal progresses further through the network to affect the ultimate outcome. A DNN uses a cascade of many layers of non-linear processing units for feature extraction and transformation. Each successive layer uses the output from the previous layer as input. Higher-level features are derived from lower-level features to form a hierarchical representation. The layers following the input layer may be convolution layers that produce feature maps that are filtering results of the inputs and are used by the next convolution layer.

In training of a DNN architecture, a regression, which is structured as a set of statistical processes for estimating the relationships among variables, can include a minimization of a cost function. The cost function may be implemented as a function to return a number representing how well the neural network performed in mapping training examples to correct output. In training, if the cost function value is not within a pre-determined range, based on the known training images, backpropagation is used, where backpropagation is a common method of training artificial neural networks that are used with an optimization method such as a stochastic gradient descent (SGD) method.

Use of backpropagation can include propagation and weight update. When an input is presented to the neural network, it is propagated forward through the neural network, layer by layer, until it reaches the output layer. The output of the neural network is then compared to the desired output, using the cost function, and an error value is calculated for each of the nodes in the output layer. The error values are propagated backwards, starting from the output, until each node has an associated error value which roughly represents its contribution to the original output. Backpropagation can use these error values to calculate the gradient of the cost function with respect to the weights in the neural network. The calculated gradient is fed to the selected optimization method to update the weights to attempt to minimize the cost function.

Figure 3:
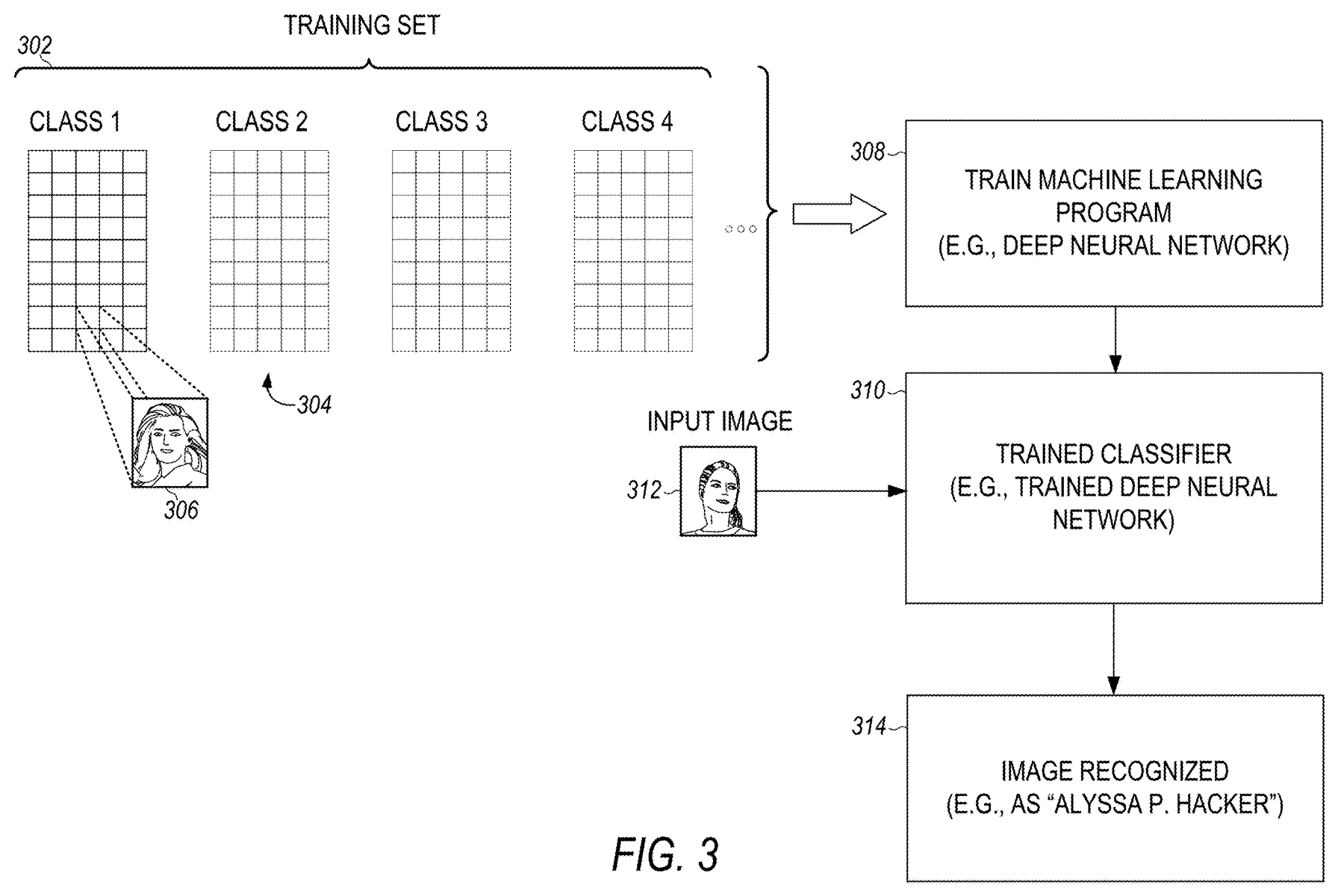

FIG. 3 illustrates the training of an image recognition machine learning program, in accordance with some embodiments. The machine learning program may be implemented at one or more computing machines. Block 302 illustrates a training set, which includes multiple classes 304. Each class 304 includes multiple images 306 associated with the class. Each class 304 may correspond to a type of object in the image 306 (e.g., a digit 0-9, a man or a woman, a cat or a dog, etc.). In one example, the machine learning program is trained to recognize images of various persons (i.e., to map a photograph of a person to the person's name), and each class 304 corresponds to each person, with each individual class 304 corresponding to an individual person (e.g., one class corresponds to Alyssa P. Hacker, one class corresponds to Ben Bitdiddle, etc.). At block 308 the machine learning program is trained, for example, using a deep neural network. At block 310, the trained classifier (e.g., the trained deep neural network), generated by the training of block 308, receives an input image 312, and at block 314 the image is recognized. For example, if the image 312 is a photograph of Alyssa P. Hacker, the classifier recognizes the image as corresponding to Alyssa P. Hacker at block 314. The classifier may include a DNN, as illustrated by the circle with the circular arrows.

FIG. 3 illustrates the training of a classifier, according to some example embodiments. A machine learning algorithm is designed for recognizing faces, and a training set 302 includes data that maps a sample to a class 304 (e.g., a class includes all the images of purses). The classes may also be referred to as labels. Although implementations presented herein are presented with reference to object recognition, the same principles may be applied to train machine-learning programs used for recognizing any type of items.

The training set 302 includes a plurality of images 306 for each class 304 (e.g., image 306), and each image is associated with one of the categories to be recognized (e.g., a class). The machine learning program is trained 308 with the training data to generate a classifier 310 operable to recognize images. In some example embodiments, the machine learning program is a DNN.

When an input image 312 is to be recognized, the classifier 310 analyzes the input image 312 to identify the class (e.g., class 314) corresponding to the input image 312.

Figure 4:
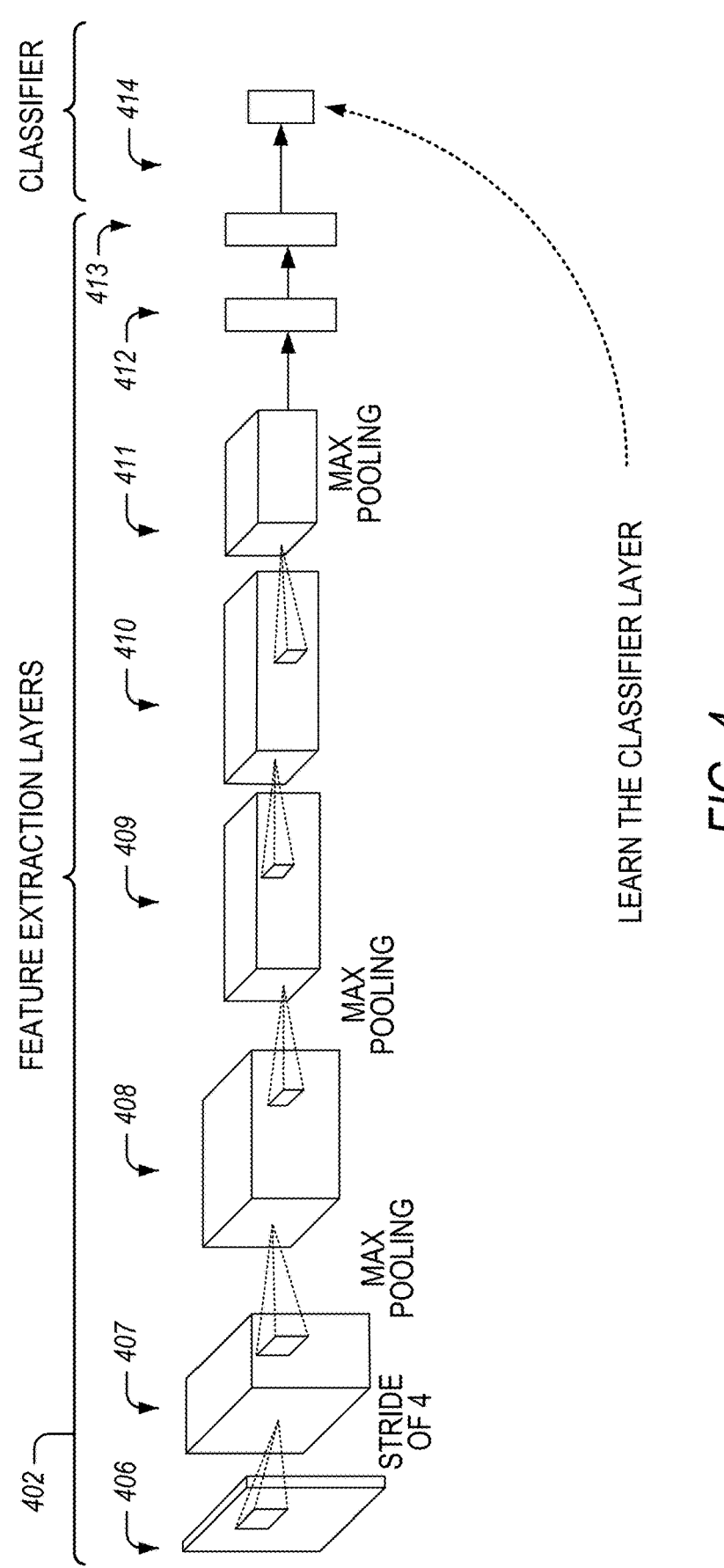
FIG. 4 illustrates a convolutional neural network, in accordance with some embodiments.

FIG. 4 illustrates a convolutional neural network, according to some example embodiments. Training a classifier of the convolutional neural network may be accomplished with feature extraction layers 402 and classifier layer 414. Each image is analyzed in sequence by a plurality of layers 406-413 in the feature-extraction layers 402.

With the development of deep convolutional neural networks, the focus in face recognition has been to learn a good face embedding-based classifier, in which faces of the same person are close to each other, and faces of different persons are far away from each other. For example, the verification task with the LFW (Labeled Faces in the Wild) dataset has been often used for face verification.

Many face identification tasks (e.g., MegaFace and LFW) are based on a similarity comparison between the images in the gallery set and the query set, which is essentially a K-nearest-neighborhood (KNN) method to estimate the person's identity. In the ideal case, there is a good face feature extractor (inter-class distance is always larger than the intra-class distance), and the KNN method is adequate to estimate the person's identity.

Feature extraction is a process to reduce the amount of resources required to describe a large set of data. When performing analysis of complex data, one of the major problems stems from the number of variables involved. Analysis with a large number of variables generally requires a large amount of memory and computational power, and it may cause a classification algorithm to overfit to training samples and generalize poorly to new samples. Feature extraction is a general term describing methods of constructing combinations of variables to get around these large data-set problems while still describing the data with sufficient accuracy for the desired purpose.

In some example embodiments, feature extraction starts from an initial set of measured data and builds derived values (features) intended to be informative and non-redundant, facilitating the subsequent learning and generalization steps. Further, feature extraction is related to dimensionality reduction, such as reducing large vectors (sometimes with very sparse data) to smaller vectors capturing the same, or similar, amount of information.

Determining a subset of the initial features is called feature selection. The selected features are expected to contain the relevant information from the input data, so that the desired task can be performed by using this reduced representation instead of the complete initial data. DNN utilizes a stack of layers, where each layer performs a function. For example, the layer could be a convolution, a non-linear transform, the calculation of an average, etc. Eventually this DNN produces outputs by classifier 414. In FIG. 4, the data travels from left to right and the features are extracted. The goal of training the neural network is to find the parameters of all the layers that make them adequate for the desired task.

As shown in FIG. 4, a "stride of 4" filter is applied at layer 406, and max pooling is applied at layers 407-413. The stride controls how the filter convolves around the input volume. "Stride of 4" refers to the filter convolving around the input volume four units at a time. Max pooling refers to down-sampling by selecting the maximum value in each max pooled region.

In some example embodiments, the structure of each layer is predefined. For example, a convolution layer may contain small convolution kernels and their respective convolution parameters, and a summation layer may calculate the sum, or the weighted sum, of two pixels of the input image. Training assists in defining the weight coefficients for the summation.

One way to improve the performance of DNNs is to identify newer structures for the feature-extraction layers, and another way is by improving the way the parameters are identified at the different layers for accomplishing a desired task. The challenge is that for a typical neural network, there may be millions of parameters to be optimized. Trying to optimize all these parameters from scratch may take hours, days, or even weeks, depending on the amount of computing resources available and the amount of data in the training set.

Figure 5:
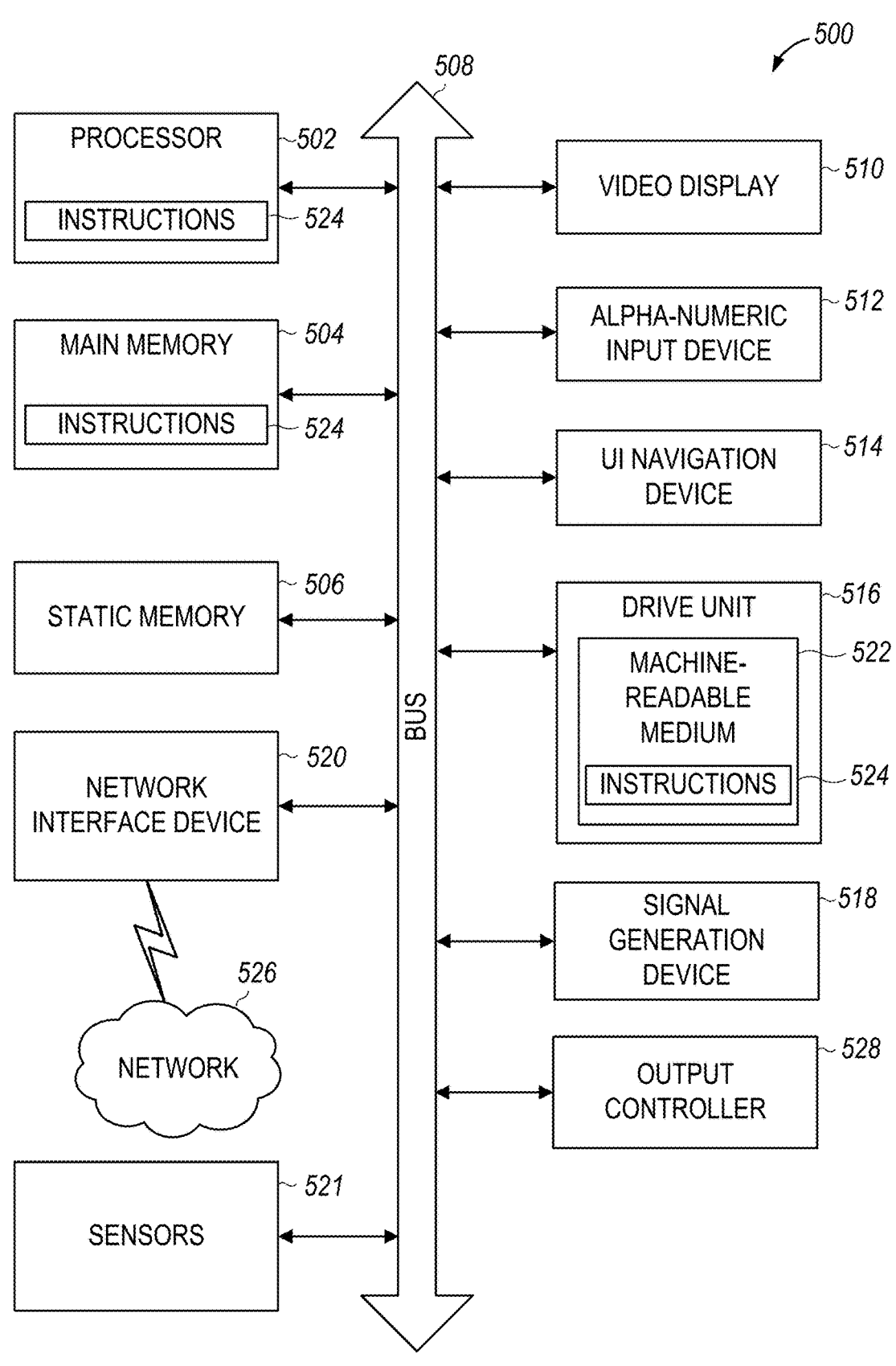
FIG. 5 is a block diagram of a computing machine, in accordance with some embodiments.

FIG. 5 illustrates a circuit block diagram of a computing machine 500 in accordance with some embodiments. In some embodiments, components of the computing machine 500 may store or be integrated into other components shown in the circuit block diagram of FIG. 5. For example, portions of the computing machine 500 may reside in the processor 502 and may be referred to as "processing circuitry." Processing circuitry may include processing hardware, for example, one or more central processing units (CPUs), one or more graphics processing units (GPUs), and the like. In alternative embodiments, the computing machine 500 may operate as a standalone device or may be connected (e.g., networked) to other computers. In a networked deployment, the computing machine 500 may operate in the capacity of a server, a client, or both in server-client network environments. In an example, the computing machine 500 may act as a peer machine in peer-to-peer (P2P) (or other distributed) network environment. In this document, the phrases P2P, device-to-device (D2D) and sidelink may be used interchangeably. The computing machine 500 may be a specialized computer, a personal computer (PC), a tablet PC, a personal digital assistant (PDA), a mobile telephone, a smart phone, a web appliance, a network router, switch or bridge, or any machine capable of executing instructions (sequential or otherwise) that specify actions to be taken by that machine.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems/apparatus (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The computing machine 500 may include a hardware processor 502 (e.g., a central processing unit (CPU), a GPU, a hardware processor core, or any combination thereof), a main memory 504 and a static memory 506, some or all of which may communicate with each other via an interlink (e.g., bus) 508. Although not shown, the main memory 504 may contain any or all of removable storage and non-removable storage, volatile memory or non-volatile memory. The computing machine 500 may further include a video display unit 510 (or other display unit), an alphanumeric input device 512 (e.g., a keyboard), and a user interface (UI) navigation device 514 (e.g., a mouse). In an example, the display unit 510, input device 512 and UI navigation device 514 may be a touch screen display. The computing machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The computing machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The drive unit 516 (e.g., a storage device) may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the computing machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the computing machine 500 and that cause the computing machine 500 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 520 may include one or more physical jacks (e.g., Ethernet, coaxial, or phone jacks) or one or more antennas to connect to the communications network 526.

Figures 6, 7:
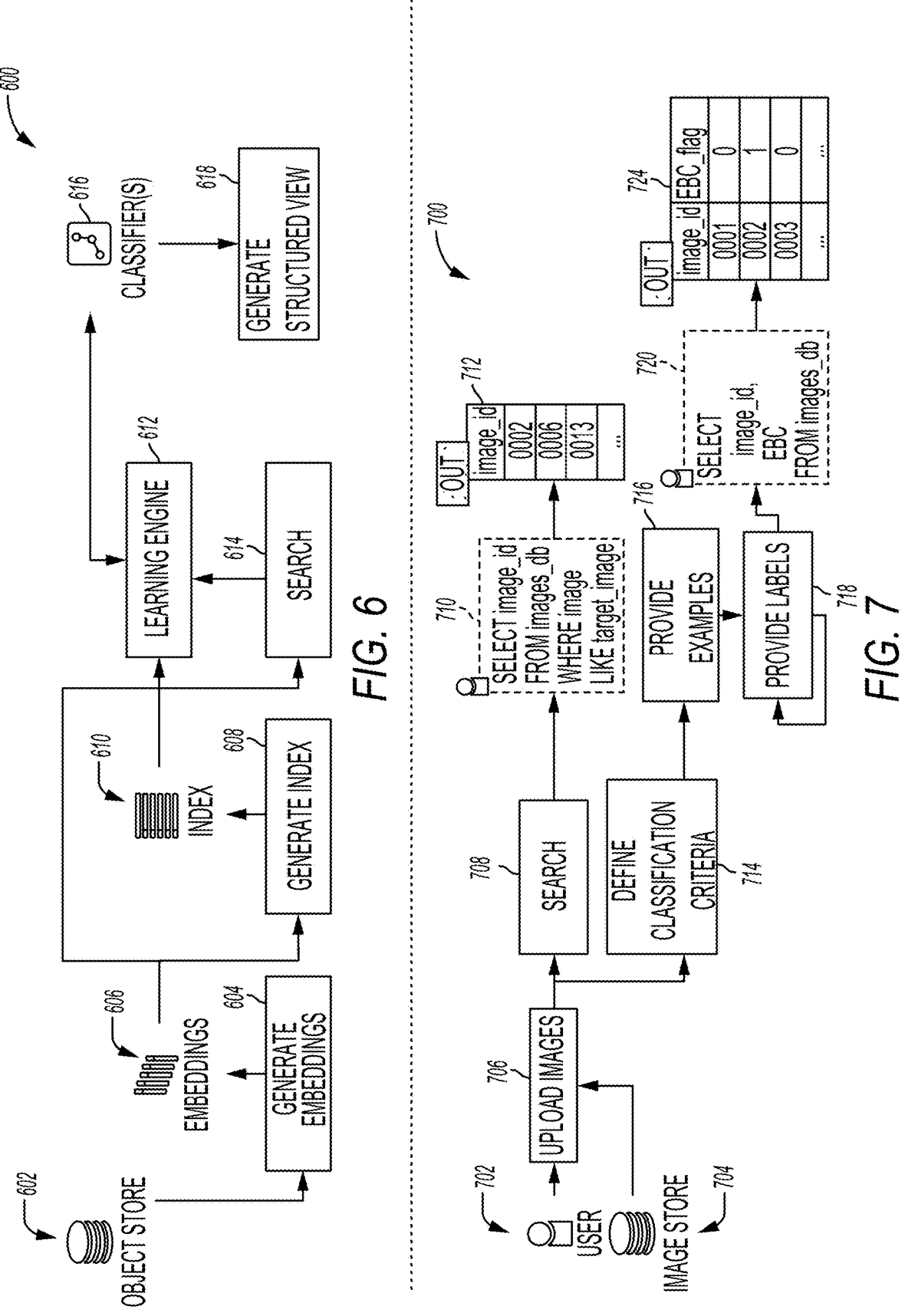
FIG. 6 is a data flow diagram of a first example of generating a structured view, in accordance with some embodiments.
FIG. 7 is a data flow diagram of a second example of image classification, in accordance with some embodiments.

FIG. 6 is a data flow diagram of a first example of generating a structured view 600, in accordance with some embodiments. As shown, generating the structured view 600 leverages an object store 602. The object store 602 may be a data repository (e.g., a database or another data storage unit) that stores images. The images may include photographs or video frames. Each video may include multiple frames, and each frame may correspond to an image.

At block 604, a server generates embeddings 606 for the images in the object store 602. An embedding of the embeddings 606 may be any logical or mathematical representation of content of an image. In some cases, an embedding of an image includes a result of a mathematical function of the image that transforms the image into a vector. The mathematical function may be applied to the image or a visual permutation thereof, for example, a resized version of the image to a specified size of the embedding model that preserves the aspect ratio of the image.

At block 608, the server generates an index 610 for the object store 602 based on the embeddings 606. The index 610 may be generated, for example, as described in conjunction with FIG. 15. In some cases, the index 610 arranges the embeddings in a multi-dimensional space (e.g., the embedding space), such that similar images may be identified based on their distance from one another in the index. For example, two images including hand-drawn paintings of a grey cat with a red background might be proximate (e.g., closer than a threshold distance in the multi-dimensional space) to one another, and those images might be distant (e.g., further than the threshold distance in the multi-dimensional space) from an image including a photograph of the New York City skyline on a clear winter day.

In some cases, the index 610 is hosted in or generated using a vector database of embeddings. As a result, the index 610 may be used to find similar embeddings to a given embedding of the embeddings 606 (e.g., to find similar images to a given image). The index 610 may be used to sort the embeddings by distance from a given embedding. The index 610 may be used to provide a very fast lookup for a given query vector (i.e., a given query embedding of the embeddings 606). For example, nearest neighbor search may be applied within the index 610. The vector database may be used to add, remove, or change the embeddings 606 in the index 610. Performing a task associated with the object store 602 may use the vector database in conjunction with the index 610.

The index may be generated by the server extracting embeddings from each image (in at least a subset of the images from the object store 602) using an embedding model, such as a pre-trained convolutional neural network. The server creates an index structure for the index 610 to organize those embeddings. The index structure may correspond to an approximate nearest neighbor (ANN) library, such as Faiss or HNSWlib, or a vector database, such as Pinescope or Vespa.

After the embeddings are generated, the server performs applies a learning engine 612 to perform machine learning (e.g., active learning, supervised learning, unsupervised learning, semi-supervised learning, reinforcement learning, or other machine learning techniques) on the index 610, the embeddings 606, and/or the object store 602. In some examples, the server leverages an image-to-text classifier to obtain natural language classifications corresponding to the embeddings. The server then maps regions of the embedding space (i.e., regions in the multi-dimensional space defined, mathematically or logically, by the multiple dimensions) to the natural language classifications. In some examples, if active learning is applied by the learning engine 612, the server selects at least a subset of the embeddings to be labeled by a human expert. The server may prioritize embeddings that are uncertain (i.e., the model is unsure about the correct labels and no label receives a score exceeding a threshold), informative (i.e., expected to improve the model's performance if labeled), and/or representative (i.e., covering a diverse region of the embedding space). Active learning may include conducting search 614 (e.g., similarity search) to identify similar images based on the embeddings. The learning engine 612 receives as input at least one of the embeddings 606, the index 610, or a result of the search 614. The learning engine 612 uses artificial intelligence, machine learning, or other techniques, such as those disclosed herein, to generate the classifier(s) 616. The classifier(s) 616 may include one or more classifiers that receive, as input, features of images, and generate output representing images having those features. The classifier(s) 616 may be implemented using artificial neural networks or other technologies.

As used herein, the phrase "active learning," may include, among other things, a recursive artificial intelligence training process where the artificial intelligence agent being trained identifies training data points for which the classification is uncertain (e.g., the confidence value is between 25% and 75%) and requests a human user to label those training data points. The artificial intelligence agent is then further trained based on the labels generated by the human user. These operations of identifying uncertain training data points and having them labeled may be recursively repeated multiple times.

The output of the learning engine 612 includes classifier(s) 616 that map images to natural language classifications based on the embeddings of the images. The classifier 616 may be used for inference to identify natural language classifications of images in the object store 602 or other images. In the inference, the embeddings of an input image are determined, and the image is mapped to a natural language classification based on the embeddings. The image may be mapped to a single natural language classification (e.g., "woman") or multiple natural language classifications (e.g., "woman," "man," "New York City," "Central Park," "tree," "path," and "squirrel" for a photograph of a man and a woman on a path in New York City's Central Park with trees and a squirrel in the background) Some examples of using the learning engine 612 to generate the classifier(s) 616 are described in conjunction with FIG. 14.

Figures 12A, 12B:
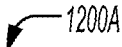
FIGS. 12A-12B illustrate example matrices storing image data, in accordance with some embodiments.

In some examples, the output of the learning engine 612 is used to generate the classifier(s) 616. The classifier(s) 616 and the embeddings 606 are used to generate a structured view 618. The structured view may include one or more matrices (e.g., as illustrated in FIGS. 12A-12B). Alternatively, the structured view may include other data structures (e.g., linked lists, sets of nodes, arrays, or the like) that could represent the data described below. The one or more matrices (or other structured view data structure) may include rows associated with images and columns associated with tags for the images. Each tag may correspond to a natural language description of content or metadata of the images. Each tag may be associated with a region of the embedding space. A cell of the one or more matrices may indicate whether an image associated with a row of the cell has a feature associated with a column of the cell. The indication may be a Boolean value (e.g., TRUE or FALSE) or a floating point value associated with a probability or a score (e.g., as determined using the artificial intelligence or other techniques disclosed herein) that the image has the feature. The structured view may be virtual or materialized. As used herein, the phrase "virtual or materialized" refers, among other things, to either a potentially computed or actually computed value. Some data systems wait to compute the value (e.g., of the cell in the one or more matrices) until it is needed to save computational time. Lazy evaluation techniques could be used to compute values (e.g., of cells) in the structured view when they are actually needed (e.g., at runtime and for display, transmission, or use in other computations) as opposed to when the structured view is generated.

Some implementations relate to search techniques. The search techniques combine the search 614 (e.g., similarity search) with the classifier 616 to enhance search capabilities. Natural language search (of an image data repository) may be combined with predefined embedding-based classifier search that may not appear in natural language. For example, a search request may include the embedding-based classifier "hand-drawn sketch" with the natural language text "driving a car." This search request may be used to obtain search results including hand-drawn sketches of driving a car.

In some cases, the server processing the search techniques receives, from a client device, a search query comprising one or more embedding-based classifiers and one or more natural language text queries. The server maps the one or more embedding-based classifiers to a first region in the embedding space based on a stored (e.g., in the memory of the server) mapping of embedding-based classifiers to regions. The server uses a natural language processing engine (e.g., a large language model or a generative pre-trained transformer) to map the one or more natural language search queries to imagery, and maps that imagery to a second region in the embedding space. Alternatively, the one or more natural language search queries are mapped to the second region based on tags of images. Another alternative uses a text-based image search to map the natural language text query to imagery, and mapping the imagery to the second region. The server determines an intersection of the first region and the second region based on the mathematical or logical definition of the first region in the embedding space and the mathematical or logical definition of the second region in the embedding space. The server generates an output to the search query comprising imagery from the intersection of the first region and the second region. The server transmits, to the client device for display at the client device, the output to the search query.

Some implementations relate to temporal concepts. Temporal concepts classify arbitrarily long sequences of images or sequences within videos into user-defined concepts. Temporal concepts may include extending the classifier 616 to videos and image sequences in videos.

In some cases, if an embedding-based classifier (e.g., corresponding to "elephant" or "princess") appears in a video frame, the embedding-based classifier is likely to appear in other video frames of the same video, especially those that are close in time to the video frame where the embedding-based classifier appeared. Other embedding-based classifiers (e.g., "cartoon," "computer-generated animation," or "1950s cinematography," or "black-and-white video frames") might necessarily (or with very high likelihood) apply to entire video frames. Similarly, a video featuring one embedding-based classifier (e.g., "princess") is likely to feature semantically-related embedding-based classifiers (e.g., "prince," "king," "queen," "castle," or "crown"). The technology described herein for identifying embedding-based classifiers in video frames may take advantage of this information to classify embedding-based classifiers in videos. For example, if one frame in a video is identified as including the embedding-based classifier "princess," adjacent frames might also be studied to determine if they are related to the embedding-based classifier "princess." Furthermore, the frames in the video, especially those close-in-time to the "princess" frame, might be studied to determine if they are associated with the embedding-based classifier that are semantically-related to "princess" listed above.

A vector database, specifically designed to efficiently store, manage, and query high-dimensional vectors, operates in conjunction with the index 610 of the embeddings 606 to facilitate rapid and accurate retrieval of visually and semantically similar images from the object store 602.

The embeddings 606, generated using the techniques described herein, include numerical vectors based on images that encapsulate the visual and/or semantic properties of the images. These embeddings 606 are stored within the vector database, which may use specialized indexing techniques, such as Hierarchical Navigable Small World (HNSW) or Inverted File Index (IVF), to optimize similarity search operations.

To locate similar images within the object store 602, a query image undergoes the embedding process, generating a corresponding vector (e.g., a corresponding embedding). This vector is then compared with the vectors within the index 610 using similarity metrics, such as cosine similarity or Euclidean distance. The vector database subsequently returns images associated with the most similar embeddings 606 (i.e., the closest (e.g., in Euclidean distance) embedding in the embedding space), signifying a high degree of visual and/or semantic correlation.

Some implementations provide similarity search, which enables the rapid identification of visually and/or semantically similar images. Some implementations provide scalability, including the capability of effectively managing large-scale image datasets without compromising performance. Some implementations provide semantic search, which facilitates comprehension of image content beyond mere keywords and metadata, empowering contextual search capabilities.

FIG. 7 is a data flow diagram of a second example of image classification 700, in accordance with some embodiments. As shown in FIG. 7, a user 702 accesses an image store 704 (e.g., corresponding to the object store 602). At block 706, the user 702 uploads images to the image store 704. The uploaded images are associated with embeddings. At block 708, a server runs a search. The search may be for similar images based on the uploaded images. Alternatively, the search may include a natural language (e.g., text input or audio input) based search, or a search using a SQL query. For example, the images in the image store 704 may be combined into clusters based on the embeddings, where each cluster may correspond to a region in an embedding space, where the embedding space may include a multi-dimensional space associated with the embeddings. In some examples, when images are mapped to the embedding space, the position of the embeddings are arranged into groups or clusters, with some regions of the embedding space including multiple embeddings of images and other regions including few or zero embeddings of images. The regions with the multiple embeddings may correspond to the clusters.

Figure 11:
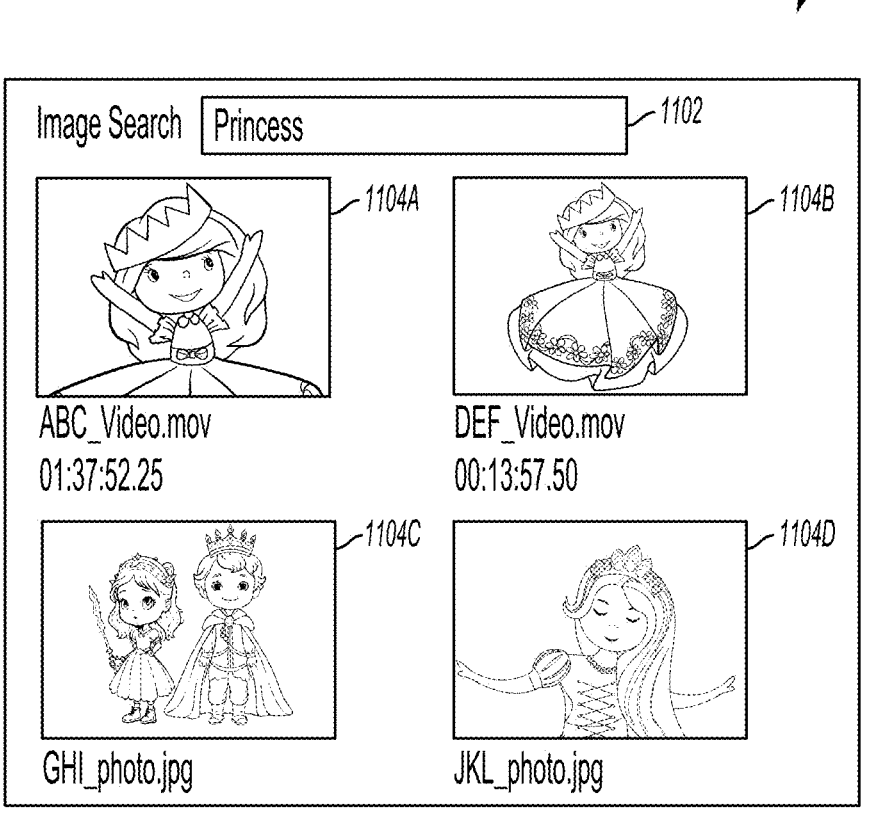
FIG. 11 illustrates an example graphical user interface for an image search, in accordance with some embodiments.

At block 710, a user (e.g., the user 702 or another user) provides a query (e.g., a SQL query) for images similar to a target image—"SELECT image_id (image identifier) FROM images_db (image database) WHERE image LIKE target_image". In the above query target_image is an image specified by the user. Alternatively, other forms of search queries may be used. For example, the search query may include at least one of a natural language input, a text input, an audio input, a video input, an image input, or a SQL query input. In response to the search query, the server generates a list 712 of image identifiers which could include a score and/or ordered ranking based list. The image identifiers may correspond to a cluster of images to which target_image is mapped. Alternatively, other techniques for displaying the search output may be used. For example, the search output may be displayed as a set of images (e.g., as illustrated in FIG. 11) or another representation of the images in the search output.

At block 714, the server defines classification criteria (e.g., based on input from the user 702 or another user). The classification criteria may identify a set of images based on features of the images. Examples of classification criteria include "black-and-white photography," "hand-drawn sketches," "man," "woman," and "cat." Each classification criterion may correspond to one or more clusters in the embedding space. However, the definition of the classification criteria might not specify those one or more clusters. The classification criteria may correspond to embedding-based classifier(s).

At block 716, the server is provided (e.g., by the user 702 or another user) with examples that represent or do not represent the classification criteria (e.g., positive examples and/or negative examples). For example, the user 702 may specify a small number (e.g., fewer than 10) of images associated with the classification criteria. The images may be selected from the image store 704, uploaded from a client device of the user 702, or from another source. The server then initiates training of an embedding-based classifier (e.g., a convolutional neural network) to identify images associated with the classification criteria based on the image embeddings. The embedding-based classifier identifies edge cases about which it is uncertain whether they meet the classification criteria. For example, the edge cases may be cases where the score assigned by the server corresponds to a probability of between 10% and 90% of being associated with the embedding-based classifier. Alternatively, other definitions of edge cases may be used. For example, the probability may be between 5% and 90% or between 10% and 95%, depending on the type of classification being done, and whether false positives or false negatives are more acceptable.

At block 718, the server prompts the user 702 or another user to provide labels for the edge cases. Alternatively, the labels may be provided using other software (e.g., other artificial intelligence software). The user 702 or the other user may provide labels for all of the edge cases or for only a portion of the edge cases. The server trains the embedding-based classifier on the provided labels. After the training of the classifier, at block 720, the user 702 or another user is able to provide a SQL query (or another type of query): "SELECT image_id, EBC flag FROM image_db," where EBC corresponds to embedding-based classifier. In response to this query, the server outputs a table 724 including a first column of image identifiers and a second column indicating whether the image identifier of the given row of the table 724 is associated with an image having the embedding-based classifier flag. This learning technique for training the classifier is described in greater detail in conjunction with FIG. 14. More detailed examples of the table 724 are described in conjunction with FIGS. 12A-12B. It should be noted that other types of queries, not necessarily SQL queries, may be used with the disclosed technology. Furthermore, the output of the query is a table 724. However, other types of outputs (e.g., a set of displayed images or a set of identifiers of images) may be generated with the disclosed technology.

FIG. 8 illustrates an example GUI 800 for displaying datasets, in accordance with some embodiments. The GUI 800 may be displayed at a client device connected to a server that performs at least a part of the techniques described in conjunction with FIG. 6 or FIG. 7.

As shown, the GUI 800 includes an icon 802 to create a dataset and a table of datasets including columns for name 804, status 806, size 808, description 810, created time 812, and last updated time 814. Each row is associated with a dataset and specifies at least one of a name (e.g., a string of characters), a status (e.g., "ready," "being processed," or "incomplete"), a size (e.g., at least one of a number of image, a number of videos, and/or a size in kilobytes), a description of the dataset (e.g., a string of characters), a created time of the dataset, and a last updated time of the dataset. The created time and/or the last updated time may specify a date and time (e.g., Dec. 1, 2023, at 8:03:23 am) or an elapsed amount of time since the creation or last update (e.g., 19 hours ago). It should be noted that some rows in the table may lack a name and/or a description.

When the create a dataset icon 802 is selected, the user of the client device is prompted to upload or specify a memory location of images and/or videos for a new dataset. The user is also prompted to provide a name and/or a description for the new dataset. After the user enters the information, the dataset is added to the table (e.g., at the bottom of the table), with the created time and the last updated time set to a current time.

Figure 9:
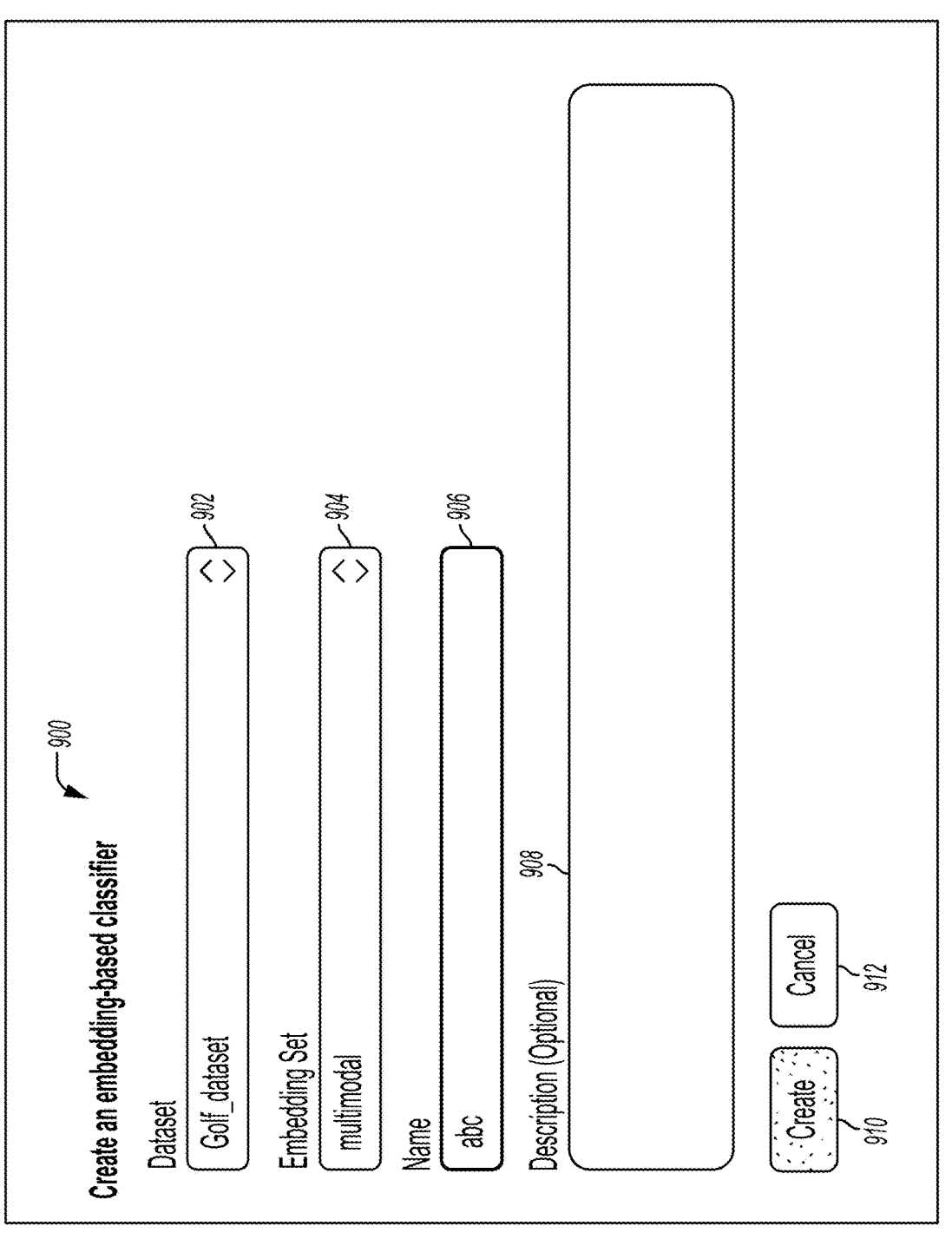
FIG. 9 illustrates an example graphical user interface for creating an embedding-based classifier, in accordance with some embodiments.

FIG. 9 illustrates an example GUI 900 for creating an embedding-based classifier, in accordance with some embodiments. An embedding-based classifier is associated with a dataset of images, for example, as described in conjunction with FIG. 8, and corresponds to a region in the embedding space. An embedding-based classifier may be associated with a natural language name describing the embedding-based classifier. Examples of embedding-based classifier names are: "cityscape," "food," "black and white photography," "cat," "man," "woman," and "hand-drawn sketches."

To create an embedding-based classifier via the GUI 900, a user may access the GUI 900 at a client device. The user selects, using the dropdown menu 902, a dataset for the embedding-based classifier. The dataset may correspond to a row in the table of FIG. 8. The user selects, using the dropdown menu 904, an embedding set for the embedding-based classifier. The embedding set specifies an embedding space and/or a technique for converting an image to an embedding (e.g., a vector) to be used. Examples of embedding sets include "multimodal." However, other embedding sets may be used depending on the classification task. For example, different embedding sets could be used to classify flowers (e.g., as roses, tulips, daisies, or other types of flowers) and to classify car parts by type. Furthermore, different embedding sets could be used to classify content of images (e.g., table, chair, man, woman, cat, or dog) and natural language (e.g., English, Chinese, or Arabic) text in images. The user enters a name for the embedding-based classifier using the input box 906. In some cases, the user enters a description for the embedding-based classifier using the input box 908. After completing making selections or entries via the dropdown menus 902, 904 and/or the input boxes 906, 908, the user selects a create button 910 to have the embedding-based classifier created and stored in memory (e.g., of the server or of a data repository connected to the server). Alternatively, the user selects a cancel button 912 to cancel the creation of the embedding-based classifier.

Figure 10:
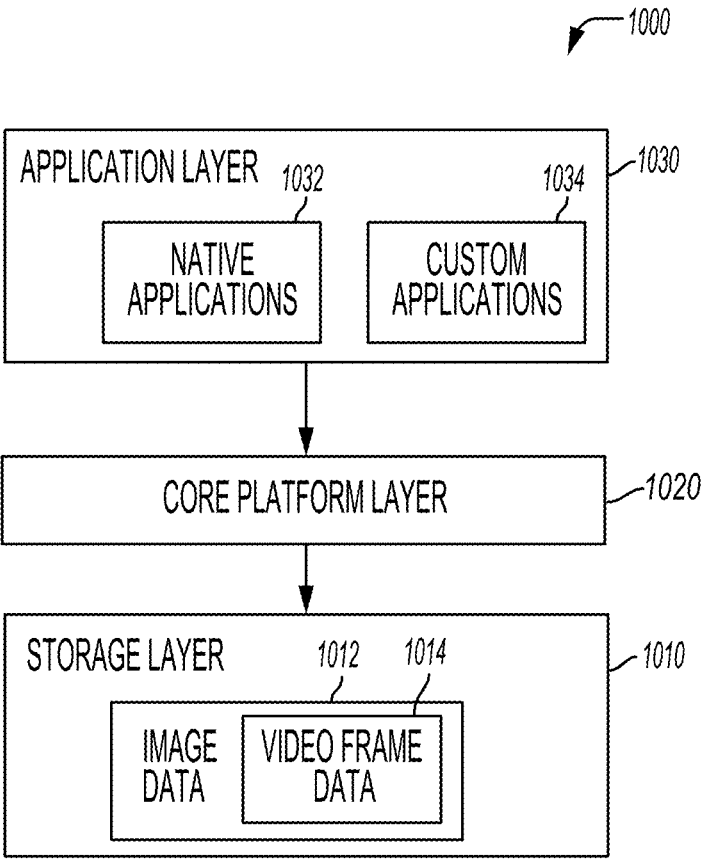
FIG. 10 illustrates an example platform structure for an image processing platform, in accordance with some embodiments.

FIG. 10 illustrates an example platform structure 1000 for an image processing platform, in accordance with some embodiments. As shown, the platform structure 1000 includes a storage layer 1010, a core platform layer 1020, and an application layer 1030.

The storage layer 1010 includes image data 1012. The image data includes 1012 includes video frame data 1014 and, in some cases, other image data such as photographs or sketches. The image data 1012 may include images and/or videos in formats such as PNG or JPEG. The storage layer 1010 serves as a foundation and houses user data of users of the platform structure 1000. Examples of storage solutions that may be used include Amazon S3, Google Cloud Storage (GCS), and Azure Blob Store. Other storage solutions (e.g., a data repository) may also be used.

The core platform layer 1020 is positioned above the storage layer 1010. The core platform layer 1020 interacts with and processes the data stored in the storage layer. The functionality of the platform performed by the core platform layer 1020 is exposed through application programming interfaces (APIs), enabling programmatic access. These APIs include a gateway for users to leverage the platforms capabilities.

The application layer 1030 is positioned above the core platform layer 1020 and includes native applications 1032 and custom applications 1034. The native applications 1032 include applications developed by a provider of the platform structure 1000. The native applications 1032 perform core functions of the platform structure 1000 and provide a user interface for users of the platform structure 1000. The custom applications 1034 are built by users of the platform structure 1000 on top of the platform structure 1000. The custom applications 1034 extend the platform's functionality to cater to specific use cases. The use cases may vary by industry (e.g., real estate, manufacturing, agriculture or the like) or by specific businesses within each industry.

FIG. 11 illustrates an example GUI 1100 for an image search, in accordance with some embodiments. The GUI 1100 may be presented at a client device, for example, a mobile phone or a laptop computer. As shown, the GUI 1100 includes an input box 1102 for entering a query and image search results 1104A-D. As illustrated, the user has entered the input text "Princess" into the input box 1102. In response, the input text is transmitted to a server, where the input text is mapped to region(s) in an embedding space based on a text-to-image conversion of the text which maps the text onto at least one image. For example, n nearest neighbors search may be used to identify n images that are stored in accessible regions (to a specific user) of the storage layer 1010 and are proximate (e.g., within a threshold distance in an embedding space) to the at least one image. Alternatively, other image search techniques may be used to identify the image search results 1104A-D based on the input text. As shown, four image search results 1104A-D are generated. The image search results 1104A and 1104B are video frames and are associated with a filename (ABC_video.mov for the image search result 1104A and DEF_video.mov for the image search result 1104B) and a timestamp (01:37:52.25 for the image search result 1104A and 00:13:57.50 for the image search result 1104B). The image search results 1104C and 1104D are image files and are associated with a filename (GHI_photo.jpg for the image search result 1104C and JKL_photo.jpg for the image search result 1104D).

FIGS. 12A-12B illustrate example matrices 1200A, 1200B storing image data, in accordance with some embodiments.

As shown, the matrix 1200A of FIG. 12A includes rows associated with images including two video frames-"video_ABC.mov frame 00:12:34.35" and "video_DEF.mov frame 00:56:12.75"—and two image files—"image_DEF.jpg" and "image_GHI.jpg." The columns are associated with image tags of "princess," "war zone," and "elephant." The columns may be associated with preexisting text, text classifications of content of images, or metadata. Each cell of the matrix 1200A includes the value of 1 (TRUE) if the image of the row is associated with the tag of the column or 0 (FALSE) if the image of the row is not associated with the tag of the column. For example, in the matrix 1200A, the value for the row "video_DEF.mov frame 00:56:12.75" and the column "princess" is 1 (TRUE), indicating that a princess is likely featured in that video frame. In another example, the value for the row "video_DEF.mov frame 00:56:12.75" and the column "war zone" is 0 (FALSE), indicating that a war zone is not likely featured in that video frame.

The matrix 1200B of FIG. 12B is similar to the matrix 1200A (i.e., has similar headings for the rows and the columns). However, the matrix 1200B includes real number probability values instead of Boolean values (0/FALSE or 1/TRUE). For example, the value for the row "video_DEF.mov frame 00:56:12.75" and the column "princess" is 0.97, indicating a 97% confidence score that a princess is featured in that video frame. In another example, the value for the row "video_DEF.mov frame 00:56:12.75" and the column "war zone" is 0.02, indicating a 2% confidence score that a war zone is featured in that video frame (or conversely a 98% confidence score that a war zone is not featured in that video frame).

The values in the cells of the matrices 1200A, 1200B may be determined using the technique described herein, based on embeddings of images. An example of a technique for determining these values is described in conjunction with FIG. 15. Also, the matrices 1200A, 1200B each include four rows and three columns. In some implementations, other numbers of rows and/or columns may exist in matrices structured as illustrated. For example, a matrix may have thousands of rows (for thousands of images) and thousands of columns (for thousands of tags).

Cells in the matrices 1200A, 1200B have Boolean or probability values. In alternative implementations, score values other than Boolean or probability values may be used. For example, the score may correspond to a percentage or another mathematical function of the probability. The tags "princess," "war zone," and "elephant," are associated with things depicted in images. In alternative implementations, tags may be associated with other features of images. For example, the tag may be "patent drawing," "black-and-white photograph," "color photograph," "hand drawing," or "painting."

It should be noted that the matrices 1200A, 1200B may have queries run on them. Alternatively, the matrices 1200A, 1200B may be merged with one or more other matrices to generate a new matrix, and queries may be run on the new matrix. As a result, queries could be run on unstructured data (e.g., image data). Furthermore, the information stored in the matrices 1200A, 1200B may be stored using other data structures (e.g., linked lists, sets of nodes, arrays, or the like). These other data structures may be used in addition to or in place of matrices in some examples of the disclosed technology. Furthermore, the matrices 1200A, 1200B are illustrated as including data generated using the techniques disclosed herein. In some cases, these matrices 1200A, 1200B may include preexisting data.

Figure 13A:
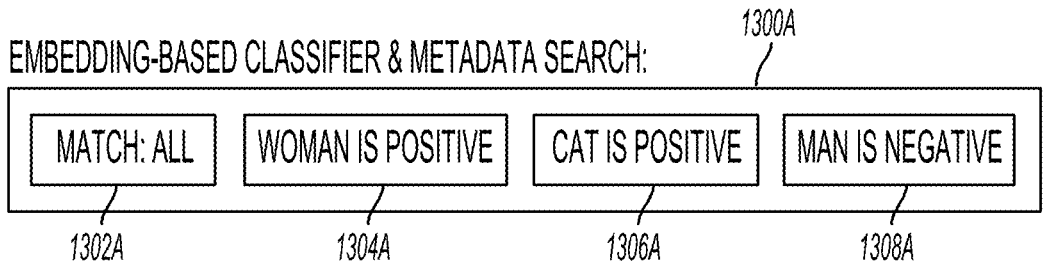
FIGS. 13A-13B illustrate example graphical user interfaces for embedding-based classifier and metadata search.
Figure 13B:
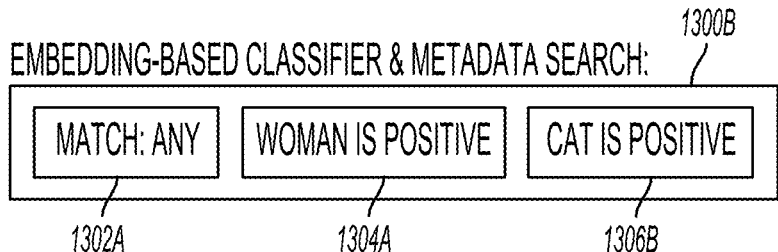

FIGS. 13A-13B illustrate example GUIs 1300A, 1300B for embedding-based classifier and metadata search. Embedding-based classifier and metadata search allows a user to search a data repository of images based on metadata of the images.

The GUI 1300A of FIG. 13A includes indicators 1302A-1308A. The indicators 1302A-1308A may be entered by the user. The indicator 1302A indicates that all of the other indicators 1304A-1308A are to be met. The indicator 1304A indicates "woman is positive." The indicator 1306A indicates "cat is positive." The indicator 1308A indicates "man is negative." Search results generated based on the GUI 1300A are images that include a woman, include a cat, and lack a man. For example, an image of a woman sitting in a chair with a cat on her lap may be included in the search results. In some cases, whether an image includes a woman, includes a cat, and/or lacks a man is determined based on embeddings of the images in the storage layer 1010.

The GUI 1300B of FIG. 13B includes indicators 1302B-1306B. The indicators 1302B-1306B may be entered by the user. The indicator 1302B indicates that any (i.e., at least one) of the other indicators 1304B-1306B is to be met. The indicator 1304B indicates "woman is positive." The indicator 1306B indicates "cat is positive." Search results generated based on the GUI 1300B are images that include a woman and/or include a cat. For example, an image of a woman standing without a cat, and image of a cat without a woman, and an image of a woman holding a cat might all be included in the search results. In some cases, whether an image includes a woman and/or includes a cat is determined based on embeddings of the images in the storage layer 1010.

It should be noted that an artificial intelligence agent may be trained to identify imagery corresponding to "woman," "cat," and/or "man" using the active learning technique described herein. In the active learning technique, a user may initially seed the training software with a small number (e.g., less than three, less than five, or less that ten) of positive examples. The training software may automatically identify negative examples based on the positive examples. Alternatively, the training software may be seeded with the small number of negative examples. Based on the positive examples and the negative examples, the artificial intelligence agent identifies uncertain examples (e.g., examples with a score between 20% and 80%) of the imagery. These uncertain examples are labeled by a human or by other artificial intelligence and the labeled uncertain examples serve as additional training data for the artificial intelligence agent. The identification of uncertain examples, their labeling, and the training based on the labeling may be repeated recursively multiple times.

An embedding-based classifier may correspond to a user-created definition, with the user providing positive and negative examples. For example, an art teacher searching for paintings that her students could use in their studies could create an embedding-based classifier for "art for students." The art teacher would start by providing several positive examples of the "art for students." These could be uploaded from a client device of the art teacher or obtained using natural language search of a data repository. In some cases, the art teacher may also provide negative examples using the techniques disclosed herein. The server may then train itself to identify "art for students" using the active learning technique disclosed herein.

Embedding-based classifiers could be used to run queries (e.g., SQL queries) against a dataset of images. For example, if there is an embedding-based classifier for "art for students" and another embedding-based classifier for "city scene," the art teacher could identify "art for students" that is a city scene using the query: "Select images from art_data_set where (art_for_students_probability+city_scene_probability)/2>0.9," or "Select images from art_data_set where art_for_students_probability>0.85 and city_scene_probability 2>0.75." Alternatively, the teacher could define a new variable, such as city_art_for_students_probability= (art_for_students_probability+city_scene_probability)/2.

The data generated herein may be integrated with an application programming interface (API) for other uses. For example, an API could be used to execute code on images where city_art_for_students_probability falls within a certain range. In some cases, the API may email, to a student wishing to study city art, a set of images where city_art_for_students_probability exceeds 70%.

For a user to create an embedding-based classifier, the user may begin with a semantic search. The user may use the results of the semantic search to identify positive and negative examples for the embedding-based classifier. The embedding-based classifier could be used for novel concepts defined by the user such as "houses I like" or "handbags I like." In some cases, the user might not know the words that describe the concept, but may be able to define the concept by viewing positive and negative examples of images. For example, a user could take a photograph of a gambrel house and upload the photograph to the server in order to initiate generation of the embedding-based classifier for "cute house like what I saw when visiting New England." The server identifies similar images and the user identifies additional positive examples from the similar images. The server automatically identifies negative examples using the techniques disclosed herein. The server then runs active learning and asks the user to identify edge cases in several round (e.g., three rounds). After the rounds, the embedding-based classifier for "cute house like what I saw when visiting New England" is generated that identifies gambrel houses, without the user ever having learned or used the term "gambrel."

In another use case of the embedding-based classifier, a social media company may generate an embedding-based classifier to classify images that do not meet trust and safety criteria of the social media company. For example, the embedding-based classifier could be trained to identify images that contain inappropriate content, such as violence or nudity, and automatically remove those images from the webpage or mobile application of the social media company.

Figure 14:
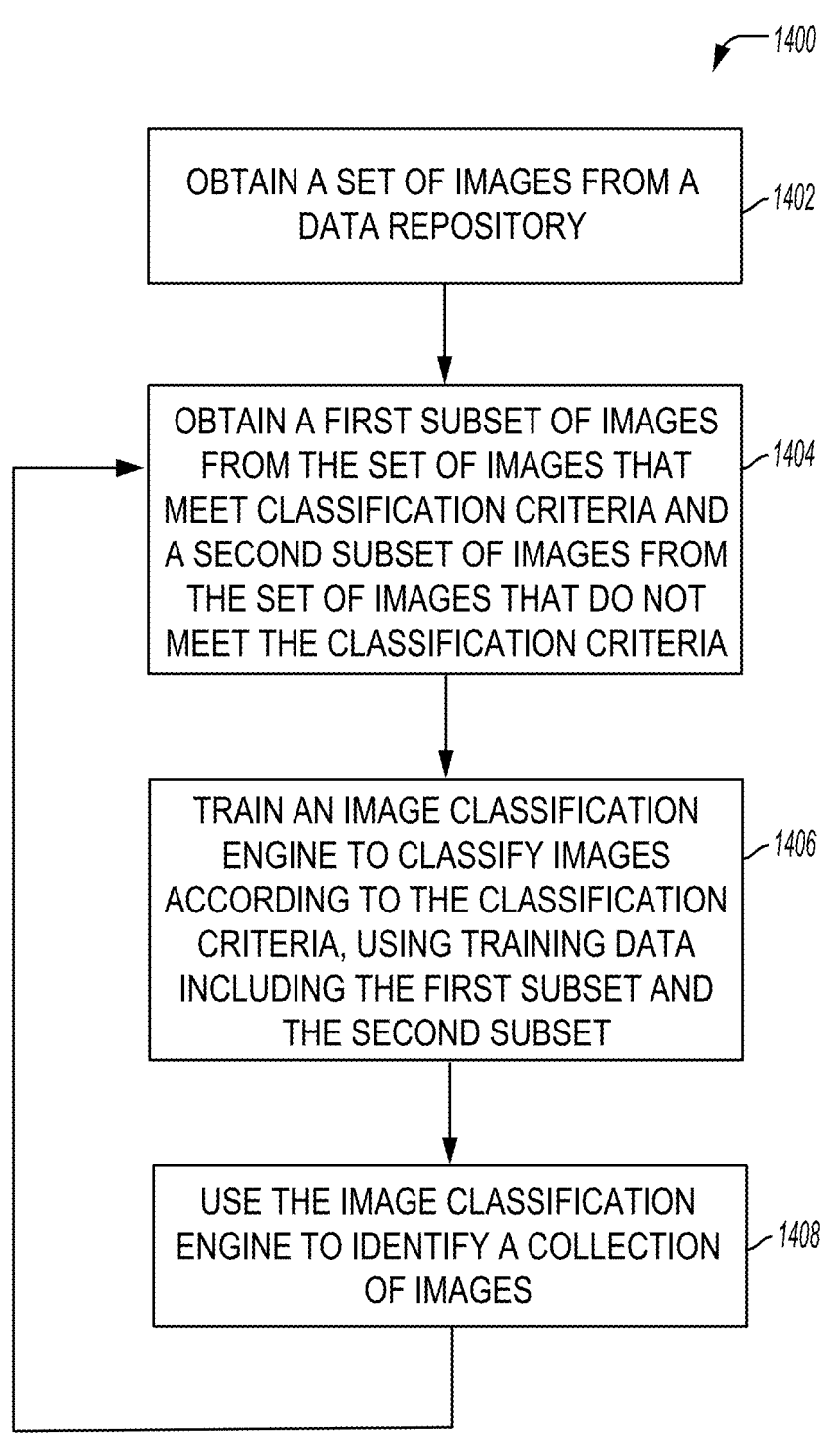
FIG. 14 is a flowchart of an example of a technique for creating an image classifier, in accordance with some embodiments.

FIG. 14 is a flowchart of an example of a technique 1400 for creating an image classifier, in accordance with some embodiments. The technique 1400 may be performed by a server that accesses a data repository that stores the content of the storage layer 1010.

At block 1402, the server obtains a set of images from the data repository. The set of images may correspond to all or a portion of the images associated with an entity (e.g., a customer of a business that operates the server and the data repository). The portion of the images may correspond to one or more datasets (e.g., corresponding to the rows of the table in FIG. 8).

At block 1404, the server obtains (e.g., receives an input) representing a first subset of images from the set of images that meet image classification criteria (i.e., positive samples) and a second subset of images from the set of images that do not meet the classification criteria (i.e., negative samples). The input may be received from an automated source or via a GUI presented at a client device communicating with the server. For example, the image classification criteria may correspond to images including hand-drawn sketches, and the first subset of images may include a small number (e.g., below a threshold number, such as four or six) of images that include hand-drawn sketches. The classification criteria may be associated with a natural language description, such as "hand-drawn sketch." The input may include fewer than the small number of images that meet the image classification criteria, thereby saving the time and effort of the human user.

In some cases, the negative samples are manually identified via the GUI. The negative samples may include fewer than the small number of images that do not meet the classification criteria, thereby saving time and effort of the human user. Alternatively, the negative samples may be identified automatically (e.g., without user input). For example, the negative samples may correspond to images that are distant (e.g., further than a threshold distance) from each image in the first subset of images in the embedding space. In some examples, a combination of manual and automatic techniques are used to identify the negative samples. For example, the negative samples may first be identified automatically, then be presented via the GUI, and then confirmed, by a user of the client device displaying the GUI, to be negative samples.

In some cases, to identify the second subset, the server identifies, within an embedding space, a region that is associated with multiple images of the first subset. The server identifies an image from the set that is outside the region (e.g., is associated with an embedding that is outside the region). The server places that image into the second subset.

At block 1406, the server trains, using training data including the first subset and the second subset, an image classification engine to classify images according to the classification criteria. The server trains the image classification engine based on embeddings corresponding to the first subset of images and embeddings corresponding to the second subset of images. The image classification engine is trained to identify embeddings corresponding to the classification criteria. The server provides an output representing the trained image classification engine.

The image classification engine may have various structures. For example, the image classification engine may include at least one of an artificial neural network, a convolutional neural network, a deep neural network, a rule-based engine, a transformer, or the like. The training may be accomplished using various training techniques, for example, supervised learning, active learning, semi-supervised learning, unsupervised learning, or the like may be used.

At block 1408, the server uses the image classification engine to identify a collection of images from the set of images. For example, the images in the collection of images may have a confidence score for meeting the classification criteria within an uncertainty range (e.g., between 25% and 75%). The server transmits image(s) from the collection to the client device for display via the GUI. The server receives, from the client device, an indication whether the image(s) meet the classification criteria. Alternatively, the server may transmit the images to a software engine (e.g., another artificial intelligence engine) for classification (as meeting or not meeting the classification criteria) by the software engine. Images from the collection that meet the classification criteria may be added to the first subset, and images from the collection that do not meet the classification criteria may be added to the second subset. In some cases, after block 1408, the server returns to block 1404, where the server further trains the image classification engine based on the received indication. This process may be recursively repeated multiple times, for multiple collections. As a result, the server receives additional training data for the image classification engine. For example, the server might be able to train the image classification engine on "confusing" data about which the image classification engine is uncertain.

It should be noted that the training technique described in conjunction with FIG. 14 may be performed with images that are untagged, and the image classification engine may be trained based on embeddings of images, rather than based on tags. Furthermore, the set of images used for training may include video frames and/or images that are not from videos.

In some cases, the server uses the trained image classification engine (and, in some cases, other image classifiers) to predict tags for an additional subset of images from the data repository. The tags may correspond to content of the images (e.g., "flower" or "train") or features of the images (e.g., "photograph" or "painting"). The server generates a matrix. A first dimension of the matrix specifies an image from the additional subset. A second dimension of the matrix specifies a tag from the tags. A cell of the matrix represents whether the image of the first dimension corresponding to the cell is associated with the tag of the second dimension corresponding to the cell. Examples of the matrix are illustrated in FIGS. 12A-12B and described above in conjunction with those figures. An example of a technique for generating the matrix is described in conjunction with FIG. 15.

In some cases, the server uses the trained image classification engine to generate an image search engine. The image search engine is configured to search images in the data repository based on a search input comprising an identification of a region in an embedding space and a natural language text. For example, if there is a region in the embedding space corresponding to "flower" and the user wishes to view images of red flowers, the user may specify a search for the natural language word "red" and the region of the embedding space corresponding to "flower."

Figure 15:
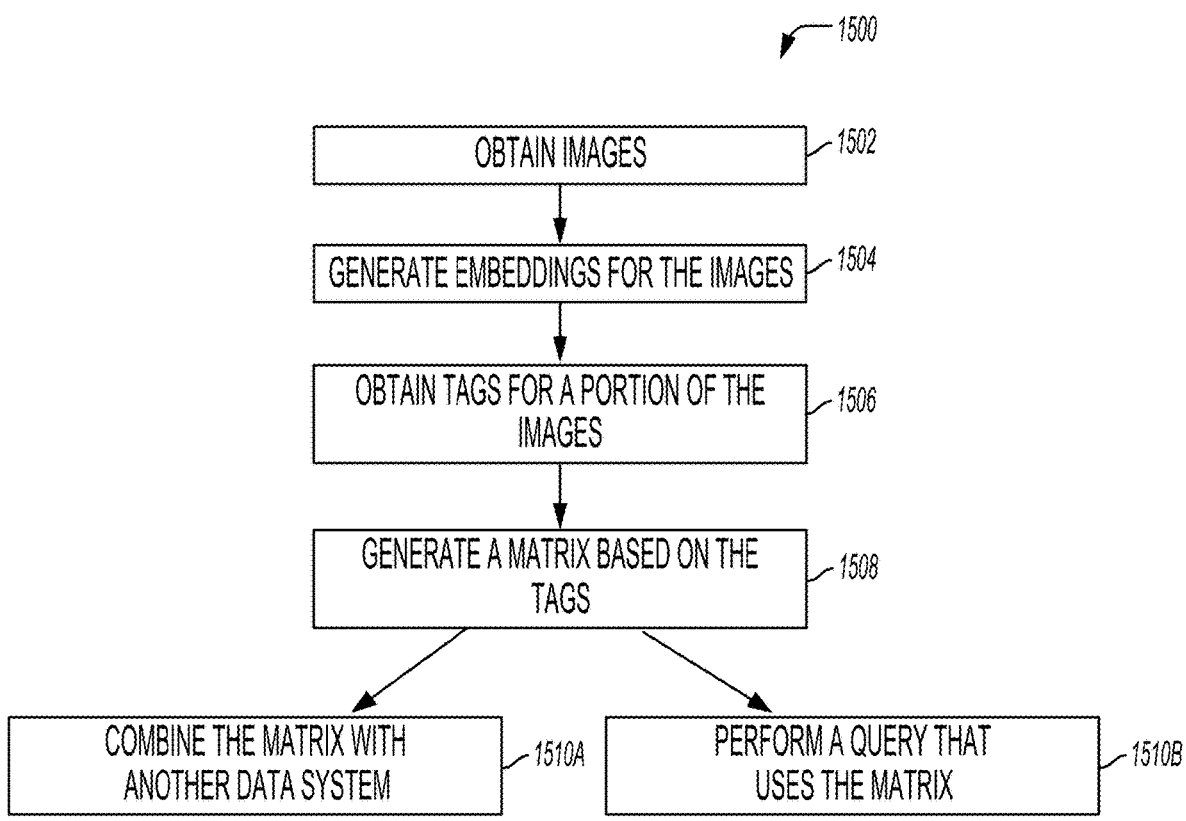
FIG. 15 is a flowchart of an example technique for structuring image data, in accordance with some embodiments.

FIG. 15 is a flowchart of an example technique 1500 for structuring image data, in accordance with some embodiments. The technique 1500 may be performed by a server that accesses a data repository that stores the content of the storage layer 1010.

At block 1502, the server obtains a set of images from the data repository. The set of images may be images in the storage layer 1010 that are associated with a single entity, such as a single customer of a business associated with the server and the data repository. The data repository may be a database or another type of data store.

At block 1504, the server generates embeddings for the set of images. An embedding of an image may be any logical or mathematical representation of content of the image. In some cases, an embedding of an image includes a result of a mathematical function of the image that transforms the image into a vector. The mathematical function may be applied to a modified or augmented version of the image, such as an image resized to a specified size of the embedding model that preserves the aspect ratio of the image. The embedding model may include a text embedding model that maps text to embeddings and an image embedding model that maps an image to an embedding. The embedding model may be trained to be a text-image similarity model or the like.

At block 1506, the server obtains tags for at least a portion of the images using the embeddings. The tags may be virtual or materialized. The tags may be obtained by an image classification engine (such as the image classification engine generated by the technique 1400 or another image classification engine) and may correspond to a description of content of images associated with the embeddings. The image classification engine uses the embeddings to classify images. Examples of natural language titles include: "black-and-white photography," "hand-drawn sketches," "impressionist art," "pointillism art," "elephant," "cat," "woman," and "man."

At block 1508, the server generates a matrix based on the tags. The matrix, and/or any cell(s) thereof, may be virtual or materialized. The matrix may correspond to the matrix 1200A and/or the matrix 1200B. In some cases, the matrix has at least two dimensions. For example, the matrix may be a two-dimensional table or a table having more than two dimensions. A first dimension (e.g., a row dimension) of the matrix identifies an image from the set of images. A second dimension (e.g., a column dimension) of the matrix identifies a tag of an embedding. A cell in the matrix comprises a value associated with the image of the first dimension corresponding to the cell having the tag of the second dimension of the cell. The value may be a Boolean (e.g., TRUE if the image has the embedding, FALSE otherwise) value, a probability value (representing a probability of the image having the embedding), or a score value, where the score value is a mathematical function of the probability value. The server provides an output representing the matrix. The output may include the matrix and/or an indication that the matrix has been created. After block 1508, block 1510A and/or block 1510B may be executed.

At block 1510A, the server combines the matrix with another data system (or multiple other data systems) to generate a new data system. The server may then run queries on the new data system. As a result, data based on images could be merged with other data to generate a large analytic system, on which queries (e.g., SQL queries) could be performed.

At block 1510B, the server performs a query (or multiple queries) that uses the matrix. The query may be an analytic query, for example, a SQL query. For example, the server may execute a query on the matrix and provide a result of the query. The result may be displayed at a client device or transmitted to a storage unit. As a result of some implementations of the disclosed technology, unstructured image data may be converted into a structured format (e.g., the matrix) and analytic queries may be executed on data having the structured format.

In some cases, the server receives, from a client device, a prompt for imagery from the set of images. The prompt may include at least one of a natural language prompt, a text prompt, an audio prompt, an image prompt, or a video prompt. In some examples, the prompt is a SQL query that identifies the tag. Examples of SQL prompts are illustrated in blocks 710 and 720 of FIG. 7. The server generates, using at least one of the matrix, the embeddings, metadata, or image embedding data, a response to the prompt. The response includes at least one image from the set of images. The server transmits, to the client device, provides a visual output corresponding to the response. The visual output may correspond to all or a part of the GUI 1100.

Some active learning and search approaches are intractable for large-scale industrial settings with billions of unlabeled examples. Existing approaches search globally for the optimal examples to label, scaling linearly or even quadratically with the unlabeled data. Some implementations improve the computational efficiency of active learning and search methods by restricting the candidate pool for labeling to the nearest neighbors of the currently labeled set instead of scanning over all of the unlabeled data. Some implementations evaluate several selection strategies in this setting on large-scale computer vision datasets, such as a de-identified and aggregated dataset of 10 billion publicly shared images. Some implementations achieve similar mean average precision and recall as the traditional global approach while reducing the computational cost of selection by up to three orders of magnitude, enabling web-scale active learning.

Large-scale unlabeled datasets can contain millions or billions of examples covering a wide variety of underlying concepts (e.g., corresponding to embedding-based classifiers). Yet, these massive datasets might skew towards a relatively small number of common concepts, for example 'cats', 'dogs', and 'people'. Rare concepts, such as 'harbor seals', tend to only appear in a small fraction of the data (usually less than 1%). However, performance on these rare concepts is critical in many settings. For example, harmful or malicious content may comprise only a small percentage of user-generated content, but it can have a disproportionate impact on the overall user experience. Similarly, when debugging model behavior for safety-critical applications like autonomous vehicles, or when dealing with representational biases in models, obtaining data that captures rare concepts allows machine learning practitioners to combat blind spots in model performance. Even a simple task, such as stop sign detection by an autonomous vehicle, can be difficult due to the diversity of real-world data. Stop signs may appear in a variety of conditions (e.g., on a wall or held by a person), can be heavily occluded, or have modifiers (e.g., "Except Right Turn"). Large-scale datasets are essential but not sufficient; finding the relevant examples for these long-tail tasks is challenging.

Active learning and search methods have the potential to automate the process of identifying these rare, high-value data points, but often become intractable at-scale. Some schemes select examples over a series of rounds to improve model quality (e.g., active learning) or find positive examples in highly skewed settings (e.g., active search). Each selection round iterates over the entire unlabeled data to identify the optimal example or batch of examples to label based on uncertainty (e.g., the entropy of predicted class probabilities) or other heuristics. Depending on the selection criteria, each round can scale linearly or even quadratically with the size of the unlabeled data. The computational cost of this process has become an impediment as datasets and model architectures have increased rapidly in size. Recent work has tried to address this problem with sophisticated methods to select larger and more diverse batches of examples in each selection round and reduce the total number of rounds needed to reach the target labeling budget. Nevertheless, these approaches still scan over all of the examples to find the optimal batch for each round, which remains intractable for web-scale datasets with billions of examples. The selection rounds of these techniques might scale sublinearly with the unlabeled data size to handle these massive and heavily skewed problems.

Some aspects relate to Similarity search for Efficient Active Learning and Search (SEALS) as a simple approach to further improve computational efficiency and achieve web-scale active learning. According to some aspects, learned representations from pre-trained models can effectively cluster many unseen rare concepts. Some aspects exploit this latent structure to improve the computational efficiency of active learning and search methods by only considering the nearest neighbors of the currently labeled examples in each selection round rather than scanning over all of the unlabeled data. Finding the nearest neighbors for each labeled example in the unlabeled data can be performed efficiently with sublinear retrieval times and sub-second latency on billion-scale datasets for approximate approaches. While this restricted candidate pool of unlabeled examples impacts theoretical sample complexity, according to some aspects, SEALS achieves the optimal logarithmic dependence on the desired error for active learning. As a result, SEALS may maintain similar label-efficiency and enables selection to scale with the size of the labeled data and only sublinearly with the size of the unlabeled data, making active learning and search tractable on web-scale datasets with billions of examples.

Some aspects evaluated SEALS for both active learning and search on large scale computer vision datasets, such as a de-identified and aggregated dataset of 10 billion publicly shared images from a large internet company. Some aspects include selecting concepts spread across these datasets that range in prevalence from 0.203% to 0.002% (1 in 50,000) of the training examples. Some aspects evaluate three selection strategies for each concept: max entropy uncertainty sampling, information density, and most-likely positive. Across datasets, selection strategies, and concepts, SEALS achieved similar model quality and nearly the same recall of the positive examples as the baseline approaches, while reducing the computational cost by up to three orders of magnitude. Consequently, SEALS could perform several selection rounds over 10 billion images in seconds with a single machine, unlike the baselines that needed a cluster with tens of thousands of cores.

Active learning's iterative retraining combined with the high computational complexity of deep learning models has led to significant work on computational efficiency. Some aspects focused on selecting large batches of data to minimize the amount of retraining and reduce the number of selection rounds necessary to reach a target budget. These approaches introduce techniques to avoid selecting highly similar or redundant examples and ensure the batches are both informative and diverse, but still require at least linear work over the whole unlabeled set for each selection round. Some aspects reduce the number of examples considered in each selection round such that active learning scales sublinearly with the size of the unlabeled dataset.

Some schemes have tried to improve computational efficiency by using much smaller models as cheap proxies, generating examples, or subsampling data. A smaller model reduces the computation required per example; but unlike some implementations, it still requires passing over all of the unlabeled examples. Generative approaches enable sublinear selection runtime complexities; but they may struggle to match the label-efficiency of traditional approaches due to the highly variable quality of the generated examples. Subsampling the unlabeled data also avoids iterating over all of the data. However, for rare concepts in web-scale datasets, randomly chosen examples are extremely unlikely to be close enough to the decision boundary. Some implementations improve both the sublinear selection runtimes and the label-efficiency.

There are also specific optimizations for certain families of models. Some schemes develop custom hashing schemes for the weights from linear SVM classifiers to efficiently find examples near the decision boundary. While this enables a sublinear selection runtime complexity similar to SEALS, the hashing hyperplanes approach is non-trivial to generalize to other families of models and even SVMs with non-linear kernels. Some implementations extend to a wide variety of models and selection strategies-k-nearest neighbor (k-NN) classifiers are also advantageous because they might not require an explicit training phase. The prediction and score for each unlabeled example can be updated immediately after each new batch of labels. These approaches may implement evaluating all of the data, which can be prohibitively expensive on large-scale datasets. Some implementations target the selection phase rather than training and uses k-NNs to limit candidate examples and not as a classifier.

Active search is a sub-area of active learning that focuses on highly-skewed class distributions. Rather than optimizing for model quality, active search aims to find as many examples from the minority class as possible. Some schemes have focused on applications such as drug discovery, where dataset sizes are limited, and labeling costs are exceptionally high. Some implementations similarly focus on skewed distributions. However, some implementations consider active search settings in vision and text where the available unlabeled datasets are larger, and computational efficiency is a significant bottleneck.

Some aspects outlines the problems of active learning and search as well as the selection methods. Some aspect relate to the pool-based batch setting, where examples are selected in batches to improve computational efficiency.

Pool-based active learning is an iterative process that begins with a large pool of unlabeled data $U=\{x_1, \ldots, x_n\}$. Each example is sampled from the space x with an unknown label from the label space $y=[1, \ldots, C]$ as $(x_i, y_i)$. Some aspects additionally assume a feature extraction function $G_z$ to embed each $x_i$ as a latent variable $G_z(x_i)=z_i$ and that the C concepts are unequally distributed. Specifically, there are one or more valuable rare concepts $R \subset C$ that appear in less than 1% of the unlabeled data. For simplicity, some aspects frame this as $|R|$ binary classification problems solved independently rather than one multi-class classification problem with $|R|$ concepts. Initially, each rare concept has a small number of positive examples and several negative examples that serve as a labeled seed set $$L_r^0.$$

One goal (among other goals) of some implementations of active learning is to take this seed set and select up to a budget of T examples to label that produce a model that achieves low error.

$$A_r^T$$

that achieves low error. For each round t in pool-based active learning, the most informative examples are selected according to the selection strategy Ø from a pool of candidate examples $P_r$ in batches of size b and labeled, as shown in Algorithm 1.

For the baseline approach, $P_r = \{G_z(x) | x \in U\}$ meaning that all the unlabeled examples are considered to find the global optimal according to $\emptyset$. Between each round, the model $$A_r^t$$

is trained on $$L_r^t,$$

allowing the selectin process to adapt.

Some aspects consider max entropy (MaxEnt) uncertainty sampling:

$$\phi_{MaxEnt}(z, A_r, \mathcal{P}_r) = -\sum_{\hat{y}} P(\hat{y}|z: A_r) \log P(\hat{y}|z; A_r)|$$

Some aspects consider information density (ID):

$$\phi_{ID}(z, A_r, \mathcal{P}_r) = \phi_{MaxEnt}(z) \times \left( \frac{1}{|\mathcal{P}_r|} \sum_{z_p \in \mathcal{P}_r} \mathrm{sim}(z, z_p) \right)^{\beta}$$

In the above, $\mathrm{sim}(z, z_p)$ is the cosine similarity of the embedded examples and $\beta=1$. Note that for binary classification, MaxEnt is equivalent to least confidence and margin sampling, which are also popular criteria for uncertainty sampling. While MaxEnt uncertainty sampling only requires a linear pass over the unlabeled data, ID scales quadratically with because it weighs each example's informativeness by its similarity to all other examples. To improve computational performance, the average similarity scores can be cached after the first round so that subsequent rounds scale linearly.

Some aspects explored the greedy k-centers approach but found that it does not outperform random sampling for the experimental setup. Unlike MaxEnt and ID, k-centers might not consider the predicted labels. It tries to achieve high coverage over the entire candidate pool, of which rare concepts make up a small fraction. This might make it ineffective for some implementations.

Active search is closely related to active learning, so some of the formalism above carries over. One difference is that rather than selecting examples to label that minimize error, the goal of active search is to maximize the number of examples from the target concept r, expressed with the natural utility function $u(L_r) = \Sigma(x,y) \in L_r \mathbb{1} \{y=|r\})$. As a result, different selection strategies are favored, but the overall algorithm is similar to Algorithm 1.

Some aspects consider an additional selection strategy to target the active search setting, most-likely positive (MLP):

$$\phi_{MLP}(z, A_r, \mathcal{P}_r) = P(r|z; A_r)$$

Because active learning and search are similar, some aspects evaluate all selection criteria above in terms of the error the model achieves and the number of positives.

| Algorithm 1 BASELINE APPROACH |
| --- |
| Require: unlabeled data U, labeled seed set $L_r^0$, |
| feature extractor $G_s$, selection strategy $\phi(\cdot)$, batch size b, labeling budget T |

1    $\mathcal{L}_r = \{(G_z(x), y) \mid (x, y) \in L_r^0\}$

2    $\mathcal{P}_r = \{G_z(x) \mid x \in U \text{ and } (x, \cdot) \notin L_r^0\}$ 3    repeat
4       $A_r = \mathrm{train}(\mathcal{L}_r)$
5       for 1 to b do
6          $z^* = \mathrm{argmax}_{z \in \mathcal{P}_r} \phi(z, A_r, \mathcal{P}_r)$
7          $\mathcal{L}_r = \mathcal{L}_r \cup \{(z^*, \mathrm{label}(x^*))\}$
8          $P_r = P_r \backslash \{z^*\}$
9       end for
10   until $|\mathcal{L}_r|] = T$

| Algorithm 2 SEALS APPROACH |
| --- |
| Require: unlabeled data U, labeled seed set $L_r^0$, |
| feature extractor $G_x$, selection strategy $\phi(\cdot)$, batch size b, labeling budget T, k-nearest neighbors implementation $\mathcal{N}(\cdot, \cdot)$ |

1    $\mathcal{L}_r = \{(G_z(x), y) \mid (x, y) \in L_r^0\}$

2    $P_r = \cup_{(z,y) \in \mathcal{L}_r} \mathcal{N}(z, k)$
3    repeat
4       $A_r = \mathrm{train}(\mathcal{L}_r)$
5       for 1 to b do
6          $z^* = \mathrm{argmax}_{z \in \mathcal{P}_r} \phi(z, A_r, \mathcal{P}_r)$
7          $\mathcal{L}_r = \mathcal{L}_r \cup \{(z^*, \mathrm{label}(x^*))\}$
8          $P_r = (P_r \backslash \{z^*\}) \cup \mathcal{N}(z, k)$
9       end for
10   until $|\mathcal{L}_r| = T$ SEALS improves computational efficiency and impacts sample complexity. As shown in Algorithm 2, SEALS makes two modifications to accelerate the inner loop of Algorithm 1: (1) the candidate pool $P_r$ is restricted to the nearest neighbors of the labeled examples; and (2) after every example is selected, some aspects find its k nearest neighbors and update $P_r$. Both modifications can be done transparently for many selection strategies, making SEALS applicable to a wide range of methods.

By restricting the candidate pool to the labeled examples' nearest neighbors, SEALS applies the selection strategy to at most $k|L_r|$ examples. Finding the k nearest neighbors for each labeled example adds overhead, but it can be calculated efficiently with sublinear retrieval times and sub-second latency on billion-scale datasets for approximate approaches.

Each selection round scales with the size of the labeled dataset and sublinearly with the size of the unlabeled data. Excluding the retrieval times for the k nearest neighbors, the computational savings from SEALS are directly proportional to the pool size reduction for $\emptyset_{MaxEnt}$ and $\emptyset_{MLP}$, which is lower bound by $|U|/k|L_r|$. For $\emptyset_{ID}$, the average similarity score for each example only needs to be computed once when the example is first selected. This caching means the first round scales quadratically with $|U|$ and subsequent rounds scale linearly for the baseline approach. With SEALS, each selection round scales according to $O((1+b_k)$ $|P_r|)$ because the similarity scores are calculated as examples are selected rather than all at once. The resulting computational savings of SEALS varies with the labeling budget T as the upfront cost of the baseline amortizes. Nevertheless, for large-scale datasets with millions or billions of examples, performing that first quadratic round for the baseline might, in some cases, be prohibitively expensive.

Generating the embeddings and indexing the data can be expensive and slow. However, this cost amortizes over many selection rounds, concepts, or other applications. Similarity search is a critical workload for information retrieval and powers many applications, including recommendation, with deep learning embeddings increasingly being used. As a result, the embeddings and index can be generated once using a generic model trained in a weak-supervision or self-supervision fashion and reused, making our approach just one of many applications using the index. Alternatively, if the data has already been passed through a predictive system (for example, to tag or classify uploaded images), the embedding could be captured to avoid additional costs.

To shed light on why SEALS works, some aspects analyzed an idealized setting where classes are linearly separable and examples are already embedded ($x=G_z(x)$). Let $\chi \overline{\subset} \mathbb{R}^d$ be some convex set and $w_* \in \mathbb{R}^d$. An example $x \in X$ has a label $y=1$ if $x^T w^* \geq 0$ and a label $y=-1$ otherwise. Some aspects assume that the k nearest neighbor graph $G=(X, E)$ satisfies the property that for each x, $x' \in X$, if $\|x, x'\|_2 \leq \delta$, then $(x, x') \in E$, so any point in a ball around an example x is a neighbor of x. Some aspects also assume that the algorithm is given no labeled seeds points $S=\{x_1, \ldots, x_{n0}\} \subset X$ where $n_0 \geq d-1$. To prove a result, some aspects consider a slightly modified version of SEALS that performs d−1 parallel nearest neighbor searches, each one initiated with one of the seed points $x_i$ with $i \in \{1, \ldots, d-1\}$. This procedure still aligns with the batch queries in SEALS.

Theorem 1 is as follows. Let $E>0$ and let $\gamma_i$ denote the distance from the seed $x_i$ to the convex hull of oppositely labeled seed points. There exists a constant $\sigma>0$ that quantifies the diversity of the seeds (defined below) such that after SEALS makes $$O\left(\max_{i \in \{1, \ldots, d-1\}} d\left(\frac{\gamma_i}{\delta} + \log\left(\frac{d\delta}{\epsilon \min(\sigma, 1)}\right)\right)\right)$$

queries, its estimate $\hat{w} \in \mathbb{R}$ satisfies $\|\hat{w}-w^*\| \leq \epsilon$.

The sample complexity bound may compare favorably to known optimal sample complexities in this setting: O (d/E) and O (d log(1/∈)) for passive and active learning, respectively. In particular, the SEALS bound has the optimal logarithmic dependence on ∈.

The parameter $\gamma_i$ is an upper bound on the distance of $x_i$ to the true decision boundary. Let $B_i$ denote the ball of radius $\gamma_i+2\delta+\epsilon$ centered at $x_i$, where $\epsilon >0$ is fixed. The true decision boundary must intersect $B_i$. Let $Z_i \subset B_i$ denote the set of points in $B_i$ that are within ∈ of the boundary. The constant σ is a measure of the diversity of the seed examples, defined as:

$$\sigma = \min_{z_i \in Z_i : i \in \{1, \ldots, d-1\}} \sigma_{d-1}([z_1 \ldots, z_{d-1}])$$

In the above, $\sigma_{d-1}(\cdot)$ is the (d−1)th singular value of the matrix. If the $Z_i$ sets are well separated and if the centers form a well-conditioned basis for a d−1-dimensional subspace in $\mathbb{R}^d$, then σ is a reasonable constant.

The algorithm has two phases: a slow phase and a fast phase. During the slow phase, the algorithm queries points that slowly approach the true decision boundary at a rate δ. After at most $$O\left(\max_i d\frac{y_i}{\delta}\right)$$

queries, the algorithm finds d−1 points that are within δ of the true decision boundary and enters the fast phase. Since the algorithm has already found points that are close to the decision boundary, the constraints of the nearest neighbor graph essentially might not encumber the algorithm, enabling it to home in on the true decision boundary at an exponential rate of $$O\left(d\log\left(\frac{d\delta}{\epsilon\sigma}\right)\right).$$

SEALS includes an approach to make the selection rounds of active learning and search methods scale sublinearly with the unlabeled data. Instead of scanning over all of the data, SEALS restricted the candidate pool to the nearest neighbors of the labeled set. In some aspects, SEALS achieves similar average precision and recall while improving computational efficiency by up to three orders of magnitude, enabling web-scale active learning.

Figure 16:
FIG. 16 illustrates an example system for image search, in accordance with some embodiments.

FIG. 16 illustrates an example system 1600 for image search, in accordance with some embodiments.

As shown, the system 1600 includes a client device 1602, a server 1604, and a vector database 1606. The client device 1602 may be a computing device, for example, a mobile phone, a tablet computer, a desktop computer, a laptop computer, a smart watch, or the like. The client device 1602 may communicate with the server 1604 over a network. The vector database 1606 may be a vector database storing vectors representing potential search results (e.g., images or other types of data).

As illustrated, the client device 1602 transmits an image search query 1608 to the server 1604. The image search query 1608 includes search components 1610. The search components 1610 may be components of search queries as described throughout this document. The image search query 1608 may be entered, at the client device 1602, via a graphical user interface (e.g., as illustrated in FIG. 11 or FIGS. 13A-13B) for specifying the search components 1610. The search components 1610 may correspond to the indicators 1302A-1308A and/or the indicators 1302B-1306B. The search components 1610 may include natural language text from the image search query 1608.

The server 1604 receives the image search query 1608. The server 1604 maps each of the search components 1610 to a component embedding vector to generate multiple component embedding vectors. The server 1604 mathematically combines (e.g., by calculating sums or weighted sums using different weights) the multiple component embedding vectors to generate multiple query vectors 1612 with different mathematical combinations.

The server 1604 uses the query vectors 1612 to search the vector database 1606. The server 1604 identifies, for the query vectors 1612 derived from the different mathematical combinations, image search results 1614 based on a similarity score of a query vector of the multiple query vectors 1612 and image representations 1616 (e.g., image embedding vectors) stored in the vector database 1606. The server 1604 transmits, to the client device 1602, at least a portion of the image search results 1614. The similarity score may be a dot product or a cosine similarity. The image search results 1614 may include the images for which the similarity score of the query vector (of the query vectors 1612) and the image embedding vector (in the image representations 1616) exceeds a threshold.

The vector database 1606 is described herein as being a database storing the image representations 1616 mapped to a vector space. In alternative implementations, a data storage unit that is not a database may be used to store the image representations 1616. In some implementations, the vector database 1606 resides on the server 1604, rather than outside the server 1604 (as illustrated).

In some cases, at least a portion of the mathematical combinations are determined based on the set of image search results. For example, a human reviewer may indicate which search results are approved and mathematical combinations similar to the approved search results may be used to generate further search results. In some cases, the set of image search results 1614 comprises multiple images, wherein, for each image of the multiple images, the similarity score of the query vector and the image embedding vector for the image exceeds a threshold. In some cases, the set of image search results comprises n images having n highest values, from among images of the vector database, of the similarity score of the query vector and the image embedding vector for each image, where n is a positive integer.

In some implementations, a portion of the image search results 1614 (rather than each and every one of the image search results 1614) is transmitted from the server 1604 to the client device 1602. The portion may be selected by computing, for each image from at least a subset of image in the images search results 1614, a product of probabilities that the image is associated with each of the search components 1610. The portion is then identified based on the product of probabilities.

In FIG. 16, the vector database 1606 is illustrated as running outside of the server 1604. In some implementations, the vector database 1606 may be a component of the server 1604, and may execute within the server 1604.

Figure 17:
FIG. 17 is a data flow diagram of an example of image search, in accordance with some embodiments.

FIG. 17 is a data flow diagram of an example of image search 1700, in accordance with some embodiments.

As shown, the image search 1700 begins with receipt (e.g., by a server such as the server 1604) of an image search query 1702. The image search query 1702 includes Boolean filtering criteria 1704 and probabilistic search criteria 1706. The Boolean filtering criteria 1704 includes any Boolean criteria, which is either true or false (and not probabilistic) for a given image. For example, the Boolean filtering criteria 1704 may include at least one of a presence of a tag, an absence of a tag, a timestamp range, a geographic location being inside or outside of a geographic region, or a numerical range. The Boolean filtering criteria 1704 may include a Boolean expression comprising two or more criteria. For example, the Boolean filtering criteria 1704 may include an image being tagged with "size medium," an image having a geographic location tag in the city of San Francisco, an image being taken between 1 Mar. 2024 and 31 Mar. 2024, an image being edited between 1 Apr. 2024 and 15 Apr. 2024, or the like. The probabilistic search criteria 1706 may include at least one of a text-based criterion, a classifier-based criterion, or a similarity criterion to an input image.

The probabilistic search criteria 1706 may correspond to the search components 1610, and the image search query 1702 may correspond to the image search query 1608.

The server determines a number of filtering search results by searching a relational database 1708 according to the Boolean filtering criteria. As shown, the server identifies N filtering search results 1710. The server may determine that there are N filtering search results 1710 may be identified using pre-filtering, post-filtering, or any other technique. The server determines whether N is greater than or less than a threshold T.

At 1712, the server determines that N<T. In response, at 1714, the server applies the probabilistic search criteria 1706 to the N filtering search results to determine the results of the image search query 1702. After 1714, the image search 1700 ends.

At 1716, the server determines that N>T. In response, the server searches a vector database 1718 using the probabilistic search criteria 1706. The vector database 1718 may correspond to the vector database 1606. In some cases, the vector database 1718 is searched in parallel with the relational database 1708. Searching the vector database 1718 yields M probabilistic search results 1720.

At 1722, the server filters the M probabilistic search results 1720 according to the Boolean filtering criteria to determine the results of the image search query 1702. After 1722, the image search 1700 ends.

In some cases, the relational database 1708 and the vector database 1718 store a common dataset. Alternatively, the relational database 1708 and the vector database 1718 may store different datasets, or datasets that have a non-zero intersection that is different from the union of the datasets. The relational database 1708 and the vector database 1718 are described herein as being databases. However, in alternative implementations, data storage units that are not databases may be used with the disclosed technology.

As described herein, the decision to proceed to block 1712 or to block 1716 after block 1710 is made based on whether N<T or N>T. In alternative implementations, the decision may be made based on whether N is within a range or outside the range. In alternative implementations, the decision may be based on whether N is within at least one of multiple ranges or outside the multiple ranges.

Figure 18A:
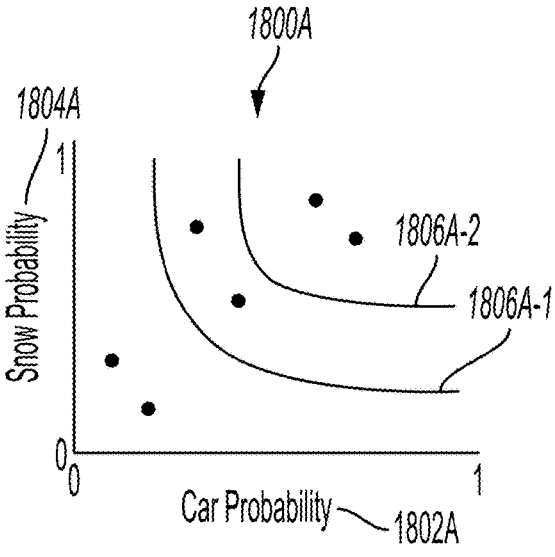
FIG. 18A illustrates an example probability graph for a set of images, in accordance with some embodiments.

FIG. 18A illustrates an example probability graph 1800A for a set of images in a data repository (e.g., the vector database 1606), in accordance with some embodiments. As shown, the axis 1802A is associated with "car probability" or the probability that the image includes a car. The axis 1804A is associated with "snow probability" or the probability that the image includes snow. The dots represent images, and the contour curves 1806A-1 and 1806A-2 represent curves where a mathematical function (e.g., a product) of the car probability and the snow probability is constant. Based on these contour curves, one can identify the two points above and to the right of the contour line 1806A-2 as being associated with the images having the highest products of "car probability" and "snow probability" or being the most likely to depict a car and snow.

Figure 18B:
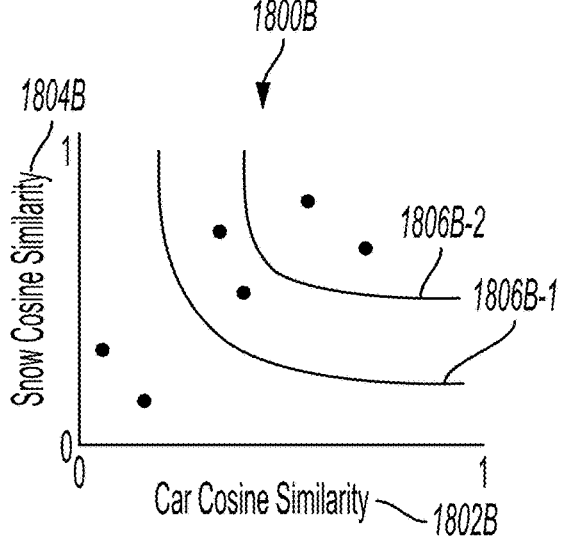
FIG. 18B illustrates a first example cosine similarity graph for a set of images, in accordance with some embodiments.

FIG. 18B illustrates a first example cosine similarity graph 1800B for a set of images in a data repository (e.g., the vector database 1606), in accordance with some embodiments. It should be noted that the probability for car or snow in FIG. 18A is computed as a function of the cosine similarity for car or snow in FIG. 18B. This means that an image with higher cosine similarity than another image will also have higher probability and vice versa. This might not be reflected in the drawings, which are not drawn to scale.

As shown, the axis 1802B is associated with "car cosine similarity" and measures the cosine similarity of the vectors associated with the images (indicated with dots) to the concept "car." The axis 1804B is associated with "snow cosine similarity" and measures the cosine similarity of the images to the concept "snow." Cosine similarity is a metric used to measure the similarity between two vectors in a multi-dimensional space. It is calculated as the cosine of the angle between the two vectors, which results in a value between −1 (exactly opposite) and 1 (exactly the same). Cosine similarity focuses on the orientation of the vectors rather than their magnitude. The contour curves 1806B-1 and 1806B-2 represent curves where a mathematical function (e.g., a product) of the car cosine similarity and the snow cosine similarity is constant. Based on these contour curves, one can identify the two points above and to the right of the contour line 1806B-2 as being associated with the images having the highest products of "car cosine similarity" and "snow cosine similarity" or being the most likely to depict a car and snow based on cosine similarity (rather than probability as in FIG. 18A).

Figure 18C:
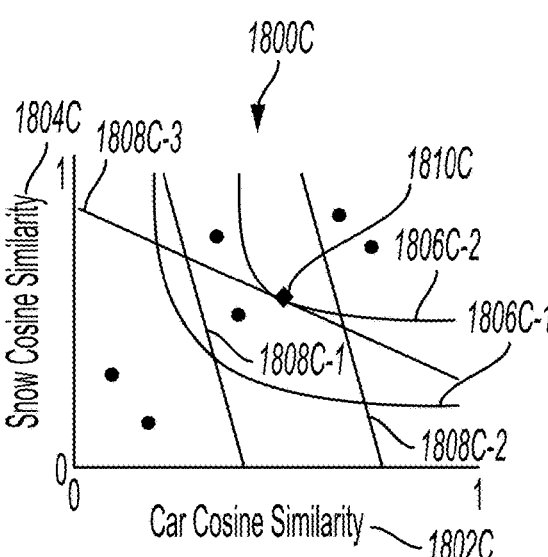
FIG. 18C illustrates a second example cosine similarity graph for a set of images, in accordance with some embodiments.

FIG. 18C illustrates a second example cosine similarity graph 1800C for the set of images from the graph 1800B, in accordance with some embodiments. As shown, the graph 1800B include a car cosine similarity axis 1802C (corresponding to the car cosine similarity axis 1802B) and a snow cosine similarity axis 1804C (corresponding to the snow cosine similarity axis 1804B). The contour curves 1806C-1 and 1806C-2 (collectively contour curves 1806C) correspond to the contour curves 1806B-1 and 1806B-2, respectively.

The cosine similarity graph 1800C further illustrates segments 1808C-1, 1808C-2, and 1808C-3 (collectively segments 1808C). Each segment 1808C represents a linear relationship between car cosine similarity and snow cosine similarity value. It should be noted that the image vectors associated with the highest "car cosine similarity" and "snow cosine similarity" (i.e., most likely to depict a car and snow) are above and to the right of each segment 1808C. For example, as illustrated, the two images that are above and to the right of the contour curve 1806C-2 are also in the intersection of the region above and to the right of the segment 1808C-2 and the region above and to the right of the segment 1808C-3. However, the segments 1808C-2 and 1808C-3 may be easier to use in calculations because linear calculations (e.g., associated with the segments 1808) with vectors may be computed more quickly than non-linear calculations (e.g., associated with the contour curves 1806). The segments 1808 represent upper bounds for the images in the vector database that have not been returned. These segments 1808 may be used to finding a point on the plot that maximizes the ranking function of the contour curves 1806 while being below a given segment 1808. An example of such a point is indicated by diamond 1810C for the segment 1808C-3. Any image in the vector database that has not been returned will have an equal or lower ranking function value as that point. It should be noted that the curve 1806C-2 is tangent to the segment 1808C-3 and only intersects the segment 1808C-3 at the point represented by the diamond 1810C. Thus, if an image (from the images returned from the vector database) has a higher ranking than that point, its ranking (e.g., $3^{rd}$, $5^{th}$, etc.) within the entire dataset is the same as its ranking within the images returned from the vector database.

Figure 19:
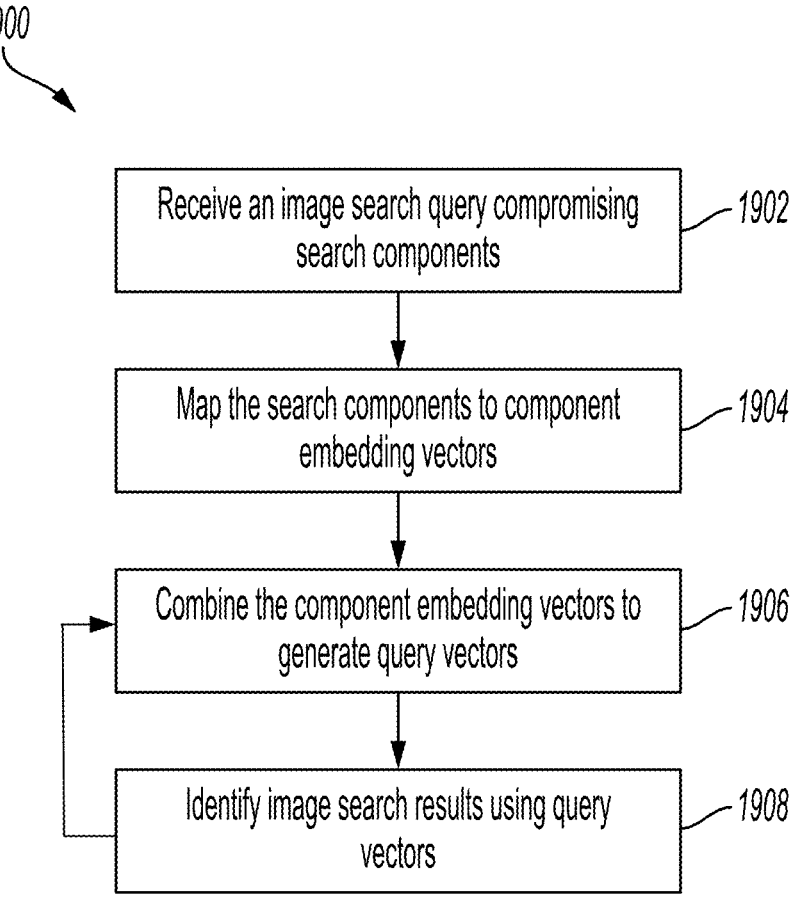
FIG. 19 is a flowchart of an example technique for image search using vectors, in accordance with some embodiments.

FIG. 19 is a flowchart of an example technique 1900 for image search using vectors, in accordance with some embodiments. The technique 1900 may be performed by a server, for example, the server 1604.

At block 1902, the server receives, from a client device, an image search query comprising multiple search components. The image search components may include probabilistic image search components. For example, image has a cat, image lacks a man, image has a woman, or the like.

At block 1904, the server maps each of the multiple search components to a component embedding vector to generate multiple component embedding vectors. For example, "cat," "not man," and "woman," may be mapped to component embedding vectors.

At block 1906, the server mathematically combines the multiple component embedding vectors to generate multiple query vectors with different mathematical combinations. The mathematical combinations may be recursively determined based on the image search results, for example, based on the image search results selected or viewed by the user of the client device.

At block 1908, the server identifies, for each of the different mathematical combinations, from a vector database storing representations of images, a set of image search results based on a similarity score of a query vector of the multiple query vectors and an image embedding vector for an image of the images. The server transmits, to the client device, a portion of the image search results. The portion may correspond to image search results having the highest similarity scores. The similarity score may be, for example, a dot product or a cosine similarity. In some cases, after block 1908, the technique 1900 returns to block 1906 in order to identify additional search results. The technique 1900 may terminate when a predetermined number of image search results is obtained.

Figure 20:
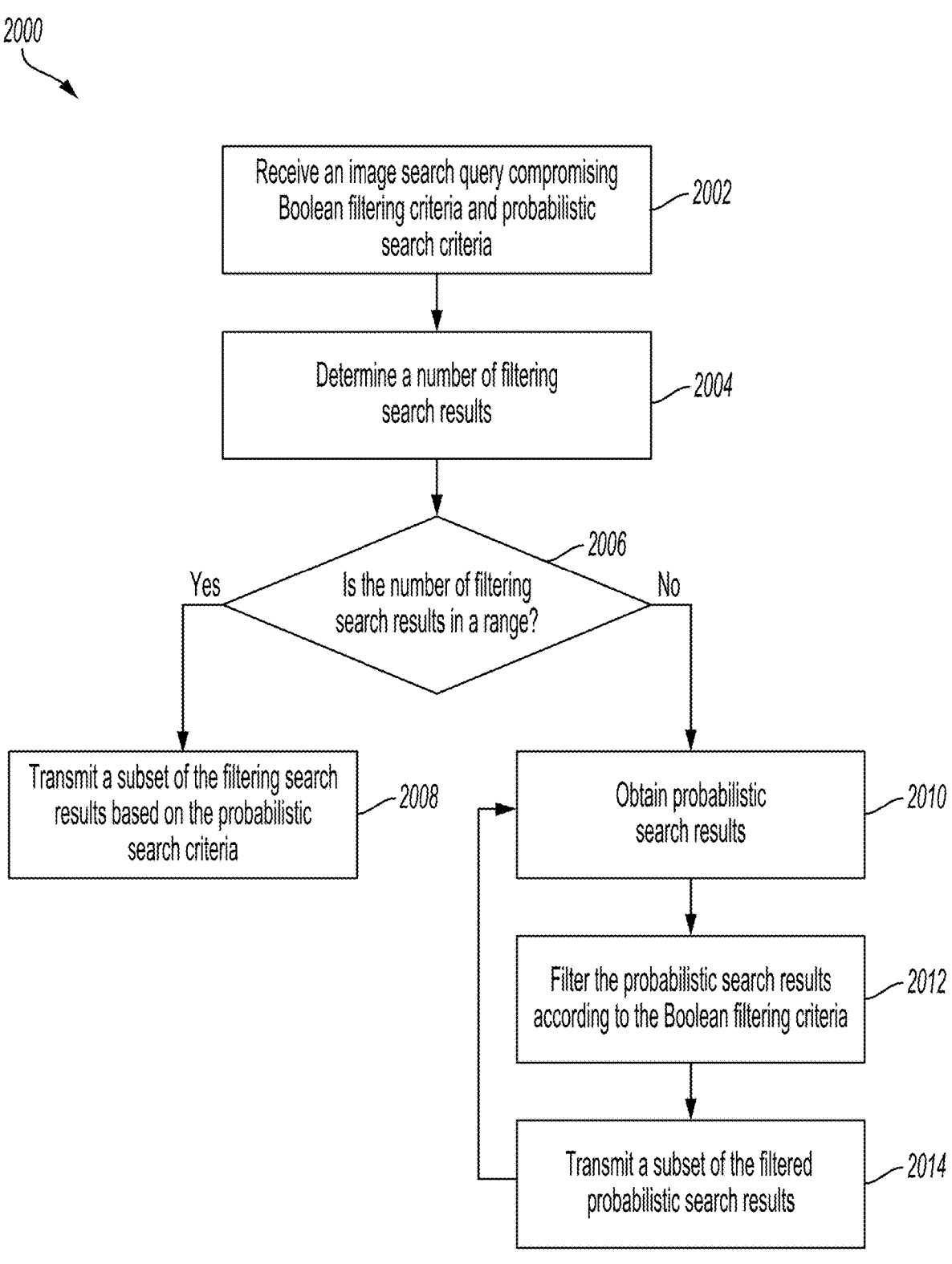
FIG. 20 is a flowchart of an example technique for image search using filtering criteria and search criteria, in accordance with some embodiments.

FIG. 20 is a flowchart of an example technique 2000 for image search using filtering criteria and search criteria, in accordance with some embodiments. The technique 2000 may be performed by a server, for example, the server 1604. The technique 2000 may incorporate elements of the image search 1700.

At block 2002, the server receives, from a client device, an image search query. The image search query includes Boolean filtering criteria and probabilistic search criteria. The Boolean filtering criteria maps to true or false for an image, without any uncertainty (e.g., an image either was taken in the year 2019 or was not taken in the year 2019, an image either is tagged as "size medium" or is not tagged as "size medium"). The probabilistic search criteria may incorporate an element of probability or uncertainty (e.g., an image may be analyzed using the techniques disclosed to determine that there is a 95% score that the image depicts a car and an 85% score that the image depicts snow). In some cases, the probabilistic search criteria may correspond to the search components described in conjunction with the technique 1900, and the technique 2000 is performed in conjunction with the technique 1900.

At block 2004, the server determines a number of filtering search results based on the Boolean filtering criteria. The number of filtering search results may be determined by searching a relational database according to the Boolean filtering criteria.

At block 2006, the server determines whether the number of filtering search results is in a range. The range may correspond to the number of filtering search results being below a threshold (e.g., 1000 or 10,000). The range may correspond a single range (e.g., between 300 and 600) or to a set of ranges (e.g., at least on of between 200 and 500, between 2000 and 5000 or between 10,000 and 15,0000). If the number of filtering search results is in the range, the technique 2000 continues to block 2008. If the number of filtering search results is not in the range, the technique 2000 continues to block 2010.

At block 2008, upon determining that the number of filtering search results is in the range, the server transmits, to the client device in response to the image search query, a subset of the filtering search results based on the probabilistic search criteria. For example, the server may transmit the filtering search results that have a score for the probabilistic search criteria that exceeds a threshold (e.g., 70% or 80%) or the n search results that have the highest scores, where n is a positive integer. The value of n may be determined by the server, for example, based on features (e.g., screen size) of the client device. After block 2008, the technique 2000 ends.

At block 2010, upon determining that the number of filtering search results is not in the range, the server obtains probabilistic search results by searching a vector database using the probabilistic search criteria. The search of the vector database may be conducted independently of the search of the relational database and may be conducted in parallel with the search of the relational database. Alternatively, the vector database may be searched before or after the search of the relational database. The search of the vector database may result in a set of search results having a score for the probabilistic search criteria exceeding a threshold or in n search results having the highest scores (or scores higher than a threshold value), where n is a positive integer.

At block 2012, the server filters the probabilistic search results according to the Boolean search criteria. Filtering the probabilistic search results may include selecting the search results for which the Boolean search criteria are true or eliminating the search results for which the Boolean search criteria are false.

At block 2014, the server transmits, to the client device in response to the image search query, at least a subset of the filtered set of probabilistic search results. The subset may include, for example, the n search results having the highest scores according to the probabilistic search criteria, or the search results that have a score for the probabilistic search criteria that exceeds a threshold value.

It should be noted that, with a Boolean filtering condition and probabilistic search score, some aspects can return the results in two ways: (1) gather all images that match the Boolean filtering condition, compute the probabilistic search score for each of the images, then return the n images with the highest probabilistic search score, or (2) iteratively retrieve the images with the highest probabilistic search score and filter out the ones that don't match the Boolean filtering condition until we have n results. Note that (2) is iterative in that some aspects continue until n results are generated. Thus, block 2014 may be followed by block 2010.

FIG. 17, FIG. 20, and their descriptions describe some techniques to make a choice between (1) and (2) based on the number of images that match the Boolean filtering condition. Some aspects may implement this choice in other ways (for example, depending on information about the search queries unrelated to the number of matching images). Additionally, some aspects may perform both (1) and (2) in parallel and stop when either of the two ways terminates and return the corresponding number of results.

Some embodiments are described as numbered examples (Example 1, 2, 3, etc.). These are provided as examples only and do not limit the technology disclosed herein.

Example 1 is a method comprising: obtaining, by a server, a set of images from a data repository; receiving an input representing a first subset of images from the set of images that meet classification criteria; identifying, by the server and based on the first subset, a second subset of images from the set of images that do not meet the classification criteria; training, using training data including the first subset and the second subset, an image classification engine to classify images according to the classification criteria, wherein training the image classification engine is based on embeddings corresponding to the first subset of images and embeddings corresponding to the second subset of images to identify embeddings corresponding to the classification criteria; predicting tags for an additional subset of images from the data repository using the image classification engine; generating a matrix, wherein a first dimension of the matrix specifies an image from the additional subset, wherein a second dimension of the matrix specifies a tag from the tags, wherein at least one cell of the matrix represents whether the image of the first dimension corresponding to the at least one cell is associated with the tag of the second dimension corresponding to the at least one cell; and providing an output representing at least one of the trained image classification engine or the matrix.

In Example 2, the subject matter of Example 1 includes, wherein training the image classification engine comprises: identifying, by the image classification engine, a collection of images from the set of images, wherein images in the collection of images have a score for meeting the classification criteria within an uncertainty range; transmitting at least one image from the collection of images to a client device; receiving, from the client device, an indication whether the at least one image meets the classification criteria; and further training the image classification engine based on the received indication.

In Example 3, the subject matter of Examples 1-2 includes, wherein identifying the second subset occurs automatically without user input.

In Example 4, the subject matter of Examples 1-3 includes, receiving a user input representing at least one image of the second subset.

In Example 5, the subject matter of Examples 1-4 includes, wherein the set of images lacks tags and has embeddings for training the image classification engine, wherein an embedding of a given image comprises a result of a mathematical function of the given image transforming the given image into a vector.

In Example 6, the subject matter of Example 5 includes, wherein the mathematical function is applied to a resized version of the given image to a predetermined size that preserves an aspect ratio of the given image.

In Example 7, the subject matter of Examples 1-6 includes, wherein the set of images comprises video frames and images that are not from videos.

In Example 8, the subject matter of Examples 1-7 includes, wherein identifying the second subset comprises: identifying, within an embedding space, a region that is associated with multiple images of the first subset; identifying at least one image from the set of images that is outside the region; and placing the at least one image into the second subset.

In Example 9, the subject matter of Examples 1-8 includes, wherein training, using training data including the first subset and the second subset, the image classification engine comprises: training the image classification engine by a training technique, wherein the first subset comprises positive samples and the second subset comprises negative samples.

In Example 10, the subject matter of Examples 1-9 includes, wherein the trained image classification engine comprises an artificial neural network, wherein the trained image classification engine is configured to receive an input image and determine, based on embedding data corresponding to the input image, whether the input image meets the classification criteria.

In Example 11, the subject matter of Examples 1-10 includes, generating, based on the trained image classification engine, an image search engine that is configured to search images in the data repository based on a search input comprising an identification of a region in an embedding space and a natural language text.

Example 12 is a computer-readable medium storing instructions operable to cause one or more processors to perform operations comprising: obtaining, by a server, a set of images from a data repository; receiving an input representing a first subset of images from the set of images that meet classification criteria; identifying, by the server and based on the first subset, a second subset of images from the set of images that do not meet the classification criteria; training, using training data including the first subset and the second subset, an image classification engine to classify images according to the classification criteria, wherein training the image classification engine is based on embeddings corresponding to the first subset of images and embeddings corresponding to the second subset of images to identify embeddings corresponding to the classification criteria; predicting tags for an additional subset of images from the data repository using the image classification engine; generating a matrix, wherein a first dimension of the matrix specifies an image from the additional subset, wherein a second dimension of the matrix specifies a tag from the tags, wherein at least one cell of the matrix represents whether the image of the first dimension corresponding to the at least one cell is associated with the tag of the second dimension corresponding to the at least one cell; and providing an output representing at least one of the trained image classification engine or the matrix.

In Example 13, the subject matter of Example 12 includes, wherein training the image classification engine comprises: identifying, by the image classification engine, a collection of images from the set of images, wherein images in the collection of images have a score for meeting the classification criteria within an uncertainty range; transmitting at least one image from the collection of images to a client device; receiving, from the client device, an indication whether the at least one image meets the classification criteria; and further training the image classification engine based on the received indication.

In Example 14, the subject matter of Examples 12-13 includes, wherein identifying the second subset occurs automatically without user input.

In Example 15, the subject matter of Examples 12-14 includes, the operations further comprising: receiving a user input representing at least one image of the second subset.

In Example 16, the subject matter of Examples 12-15 includes, wherein the set of images lacks tags and has embeddings for training the image classification engine, wherein an embedding of a given image comprises a result of a mathematical function of the given image transforming the given image into a vector.

In Example 17, the subject matter of Example 16 includes, wherein the mathematical function is applied to a resized version of the given image to a predetermined size that preserves an aspect ratio of the given image.

In Example 18, the subject matter of Examples 12-17 includes, wherein the set of images comprises video frames and images that are not from videos.

In Example 19, the subject matter of Examples 12-18 includes, wherein identifying the second subset comprises: identifying, within an embedding space, a region that is associated with multiple images of the first subset; identifying at least one image from the set of images that is outside the region; and placing the at least one image into the second subset.

In Example 20, the subject matter of Examples 12-19 includes, wherein training, using training data including the first subset and the second subset, the image classification engine comprises: training the image classification engine by a training technique, wherein the first subset comprises positive samples and the second subset comprises negative samples.

In Example 21, the subject matter of Examples 12-20 includes, wherein the trained image classification engine comprises an artificial neural network, wherein the trained image classification engine is configured to receive an input image and determine, based on embedding data corresponding to the input image, whether the input image meets the classification criteria.

In Example 22, the subject matter of Examples 12-21 includes, the operations further comprising: generating, based on the trained image classification engine, an image search engine that is configured to search images in the data repository based on a search input comprising an identification of a region in an embedding space and a natural language text.

Example 23 is a system, comprising: a memory subsystem; and processing circuitry configured to execute instructions stored in the memory subsystem to perform operations comprising: obtaining, by a server, a set of images from a data repository; receiving an input representing a first subset of images from the set of images that meet classification criteria; identifying, by the server and based on the first subset, a second subset of images from the set of images that do not meet the classification criteria; training, using training data including the first subset and the second subset, an image classification engine to classify images according to the classification criteria, wherein training the image classification engine is based on embeddings corresponding to the first subset of images and embeddings corresponding to the second subset of images to identify embeddings corresponding to the classification criteria; predicting tags for an additional subset of images from the data repository using the image classification engine; generating a matrix, wherein a first dimension of the matrix specifies an image from the additional subset, wherein a second dimension of the matrix specifies a tag from the tags, wherein at least one cell of the matrix represents whether the image of the first dimension corresponding to the at least one cell is associated with the tag of the second dimension corresponding to the at least one cell; and providing an output representing at least one of the trained image classification engine or the matrix.

In Example 24, the subject matter of Example 23 includes, wherein training the image classification engine comprises: identifying, by the image classification engine, a collection of images from the set of images, wherein images in the collection of images have a score for meeting the classification criteria within an uncertainty range; transmitting at least one image from the collection of images to a client device; receiving, from the client device, an indication whether the at least one image meets the classification criteria; and further training the image classification engine based on the received indication.

In Example 25, the subject matter of Examples 23-24 includes, wherein identifying the second subset occurs automatically without user input.

In Example 26, the subject matter of Examples 23-25 includes, the operations further comprising: receiving a user input representing at least one image of the second subset.

In Example 27, the subject matter of Examples 23-26 includes, wherein the set of images lacks tags and has embeddings for training the image classification engine, wherein an embedding of a given image comprises a result of a mathematical function of the given image transforming the given image into a vector.

In Example 28, the subject matter of Example 27 includes, wherein the mathematical function is applied to a resized version of the given image to a predetermined size that preserves an aspect ratio of the given image.

In Example 29, the subject matter of Examples 23-28 includes, wherein the set of images comprises video frames and images that are not from videos.

In Example 30, the subject matter of Examples 23-29 includes, wherein identifying the second subset comprises: identifying, within an embedding space, a region a first embedding that is associated with multiple images of the first subset; identifying at least one image from the set of images that is outside the region; and placing the at least one image into the second subset.

In Example 31, the subject matter of Examples 23-30 includes, wherein training, using training data including the first subset and the second subset, the image classification engine comprises: training the image classification engine by a training technique, wherein the first subset comprises positive samples and the second subset comprises negative samples.

In Example 32, the subject matter of Examples 23-31 includes, wherein the trained image classification engine comprises an artificial neural network, wherein the trained image classification engine is configured to receive an input image and determine, based on embedding data corresponding to the input image, whether the input image meets the classification criteria.

In Example 33, the subject matter of Examples 23-32 includes, the operations further comprising: generating, based on the trained image classification engine, an image search engine that is configured to search images in the data repository based on a search input comprising an identification of a region in an embedding space and a natural language text.

Example 34 is a method comprising: obtaining, by a server, a set of images from a data repository; generating, by the server, embeddings for the set of images; obtaining, using an image classification engine, tags for at least a portion of the images using the embeddings; generating a matrix, a first dimension of the matrix identifying an image from the set of images and a second dimension of the matrix identifying a tag, wherein a cell in the matrix comprises a value associated with the image of the first dimension of the cell having the tag of the second dimension of the cell; and providing an output representing the matrix.

In Example 35, the subject matter of Example 34 includes, receiving, by the server, a prompt for imagery from the set of images; generating, using at least one of the matrix, the embeddings, metadata, or image embedding data, a response to the prompt, the response comprising at least one image from the set of images; and providing a visual output corresponding to the response.

In Example 36, the subject matter of Example 35 includes, wherein the prompt comprises at least one of a natural language prompt, a text prompt, an audio prompt, an image prompt, or a video prompt.

In Example 37, the subject matter of Examples 35-36 includes, wherein the prompt comprises a SQL query, wherein the SQL query identifies at least one tag.

In Example 38, the subject matter of Examples 34-37 includes, wherein the matrix has at least two dimensions.

In Example 39, the subject matter of Examples 34-38 includes, wherein the value comprises at least one of a probability value, a score value, or a Boolean value.

In Example 40, the subject matter of Examples 34-39 includes, wherein the set of images comprises video frames and images that are not from videos.

In Example 41, the subject matter of Examples 34-40 includes, executing a query on the matrix; and providing a result of the query.

In Example 42, the subject matter of Examples 34-41 includes, combining the matrix with a dataset to generate a new dataset; executing a query on the new dataset; and providing a result of the query.

In Example 43, the subject matter of Examples 34-42 includes, wherein at least one tag of the tags is virtual or materialized, wherein at least one cell of the matrix is virtual or materialized.

Example 44 is a computer-readable medium storing instructions operable to cause one or more processors to perform operations comprising: obtaining, by a server, a set of images from a data repository; generating, by the server, embeddings for the set of images; obtaining, using an image classification engine, tags for at least a portion of the images using the embeddings; generating a matrix, a first dimension of the matrix identifying an image from the set of images and a second dimension of the matrix identifying a tag, wherein a cell in the matrix comprises a value associated with the image of the first dimension of the cell having the tag of the second dimension of the cell; and providing an output representing the matrix.

In Example 45, the subject matter of Example 44 includes, the operations further comprising: receiving, by the server, a prompt for imagery from the set of images; generating, using at least one of the matrix, the embeddings, metadata, or image embedding data, a response to the prompt, the response comprising at least one image from the set of images; and providing a visual output corresponding to the response.

In Example 46, the subject matter of Example 45 includes, wherein the prompt comprises at least one of a natural language prompt, a text prompt, an audio prompt, an image prompt, or a video prompt.

In Example 47, the subject matter of Examples 45-46 includes, wherein the prompt comprises a SQL query, wherein the SQL query identifies at least one tag.

In Example 48, the subject matter of Examples 44-47 includes, wherein the matrix has at least two dimensions.

In Example 49, the subject matter of Examples 44-48 includes, wherein the value comprises at least one of a probability value, a score value, or a Boolean value.

In Example 50, the subject matter of Examples 44-49 includes, wherein the set of images comprises video frames and images that are not from videos.

In Example 51, the subject matter of Examples 44-50 includes, the operations further comprising: executing a query on the matrix; and providing a result of the query.

In Example 52, the subject matter of Examples 44-51 includes, the operations further comprising: combining the matrix with a dataset to generate a new dataset; executing a query on the new dataset; and providing a result of the query.

In Example 53, the subject matter of Examples 44-52 includes, wherein at least one tag of the tags is virtual or materialized, wherein at least one cell of the matrix is virtual or materialized.

Example 54 is a system, comprising: a memory subsystem; and processing circuitry configured to execute instructions stored in the memory subsystem to perform operations comprising: obtaining, by a server, a set of images from a data repository; generating, by the server, embeddings for the set of images; obtaining, using an image classification engine, tags for at least a portion of the embeddings; generating a matrix, a first dimension of the matrix identifying an image from the set of images and a second dimension of the matrix identifying a tag, wherein a cell in the matrix comprises a value associated with the image of the first dimension of the cell having the tag of the second dimension of the cell; and providing an output representing the matrix.

In Example 55, the subject matter of Example 54 includes, the operations further comprising: receiving, by the server, a prompt for imagery from the set of images; generating, using at least one of the matrix, the embeddings, metadata, or image embedding data, a response to the prompt, the response comprising at least one image from the set of images; and providing a visual output corresponding to the response.

In Example 56, the subject matter of Example 55 includes, wherein the prompt comprises at least one of a natural language prompt, a text prompt, an audio prompt, an image prompt, or a video prompt.

In Example 57, the subject matter of Examples 55-56 includes, wherein the prompt comprises a SQL query, wherein the SQL query identifies at least one tag.

In Example 58, the subject matter of Examples 54-57 includes, wherein the matrix has at least two dimensions.

In Example 59, the subject matter of Examples 54-58 includes, wherein the value comprises at least one of a probability value, a score value, or a Boolean value.

In Example 60, the subject matter of Examples 54-59 includes, wherein the set of images comprises video frames and images that are not from videos.

In Example 61, the subject matter of Examples 54-60 includes, the operations further comprising: executing a query on the matrix; and providing a result of the query.

In Example 62, the subject matter of Examples 54-61 includes, the operations further comprising: combining the matrix with a dataset to generate a new dataset; executing a query on the new dataset; and providing a result of the query.

In Example 63, the subject matter of Examples 54-62 includes, wherein at least one tag of the tags is virtual or materialized, wherein at least one cell of the matrix is virtual or materialized.

Example 64 is a method comprising: obtaining, by a server, a set of audio files from a data repository; receiving an input representing a first subset of audio files from the set of audio files that meet classification criteria; identifying, by the server and based on the first subset, a second subset of audio files from the set of audio files that do not meet the classification criteria; training, using training data including the first subset and the second subset, an audio classification engine to classify audio files according to the classification criteria, wherein training the audio classification engine is based on embeddings corresponding to the first subset of audio files and embeddings corresponding to the second subset of audio files to identify embeddings corresponding to the classification criteria; predicting tags for an additional subset of audio files from the data repository using the audio classification engine; generating a matrix, wherein a first dimension of the matrix specifies an audio file from the additional subset, wherein a second dimension of the matrix specifies a tag from the tags, wherein at least one cell of the matrix represents whether the audio file of the first dimension corresponding to the at least one cell is associated with the tag of the second dimension corresponding to the at least one cell; and providing an output representing at least one of the trained audio classification engine or the matrix.

Example 65 is a method comprising: obtaining, by a server, a set of audio files from a data repository; generating, by the server, embeddings for the set of audio files; obtaining, using an audio classification engine, tags for at least a portion of the audio files using the embeddings; generating a matrix, a first dimension of the matrix identifying an audio file from the set of audio files and a second dimension of the matrix identifying a tag, wherein a cell in the matrix comprises a value associated with the audio file of the first dimension of the cell having the tag of the second dimension of the cell; and providing an output representing the matrix.

Example 66 is at least one apparatus comprising: means for obtaining, by a server, a set of images from a data repository; means for receiving an input representing a first subset of images from the set of images that meet classification criteria; means for identifying, by the server and based on the first subset, a second subset of images from the set of images that do not meet the classification criteria; means for training, using training data including the first subset and the second subset, an image classification engine to classify images according to the classification criteria, wherein training the image classification engine is based on embeddings corresponding to the first subset of images and embeddings corresponding to the second subset of images to identify embeddings corresponding to the classification criteria; means for predicting tags for an additional subset of images from the data repository using the image classification engine; means for generating a matrix, wherein a first dimension of the matrix specifies an image from the additional subset, wherein a second dimension of the matrix specifies a tag from the tags, wherein at least one cell of the matrix represents whether the image of the first dimension corresponding to the at least one cell is associated with the tag of the second dimension corresponding to the at least one cell; and means for providing an output representing at least one of the trained image classification engine or the matrix.

Example 67 is at least one apparatus comprising: means for obtaining, by a server, a set of images from a data repository; means for generating, by the server, embeddings for the set of images; means for obtaining, using an image classification engine, tags for at least a portion of the images using the embeddings; means for generating a matrix, a first dimension of the matrix identifying an image from the set of images and a second dimension of the matrix identifying a tag, wherein a cell in the matrix comprises a value associated with the image of the first dimension of the cell having the tag of the second dimension of the cell; and means for providing an output representing the matrix.

Example 68 is a method comprising: receiving, from a client device, an image search query comprising multiple search components; mapping each of the multiple search components to a component embedding vector to generate multiple component embedding vectors; mathematically combining the multiple component embedding vectors to generate multiple query vectors with different mathematical combinations; identifying, for each of the different mathematical combinations, from a vector database storing representations of images, a set of image search results based on a similarity score of a query vector of the multiple query vectors and an image embedding vector for an image of the images; and transmitting, to the client device, a portion of the set of image search results.

In Example 69, the subject matter of Example 68 includes, wherein the similarity score comprises a dot product.

In Example 70, the subject matter of Examples 68-69 includes, wherein the vector database stores representations of images mapped to a vector space.

In Example 71, the subject matter of Examples 68-70 includes, wherein at least a portion of the mathematical combinations are determined based on the set of image search results.

In Example 72, the subject matter of Examples 68-71 includes, wherein mathematically combining the multiple component embedding vectors comprises adding the multiple component embedding vectors.

In Example 73, the subject matter of Examples 68-72 includes, wherein mathematically combining the multiple component embedding vectors comprises weighted addition of the multiple component embedding vectors.

In Example 74, the subject matter of Examples 68-73 includes, wherein at least one of the multiple search components comprises natural language text from the image search query.

In Example 75, the subject matter of Examples 68-74 includes, wherein the set of image search results comprises the image for which the similarity score of the query vector and the image embedding vector for the image exceeds a threshold.

In Example 76, the subject matter of Examples 68-75 includes, wherein the set of image search results comprises multiple images, wherein, for each image of the multiple images, the similarity score of the query vector and the image embedding vector for the image exceeds a threshold.

In Example 77, the subject matter of Examples 68-76 includes, wherein the set of image search results comprises n images having n highest values, from among images of the vector database, of the similarity score of the query vector and the image embedding vector for each image, wherein n is a positive integer.

In Example 78, the subject matter of Examples 68-77 includes, wherein the image search query is received via a graphical user interface for specifying the multiple search components.

In Example 79, the subject matter of Examples 68-78 includes, computing, for each image from at least a subset of image in the images search results, a product of probabilities that the image is associated with each of the multiple search components; and identifying the portion of the set of image search results based on the product of probabilities.

In Example 80, the subject matter of Examples 68-79 includes, wherein the image search query comprises Boolean filtering criteria and the multiple search components, wherein identifying the set of image search results comprises: if a number of filtering search results, determined using the Boolean filtering criteria, is in a range: transmitting, to the client device in response to the image search query, a subset of the filtering search results based on the multiple search components; or if the number of filtering search results is out of the range: obtaining, using a vector database, a set of probabilistic search results according to the multiple search components; filtering the set of probabilistic search results according to the Boolean filtering criteria; and transmitting, to the client device in response to the image search query, at least a subset of the filtered set of probabilistic search results.

In Example 81, the subject matter of Example 80 includes, wherein being in the range comprises being below a threshold.

In Example 82, the subject matter of Examples 80-81 includes, wherein the Boolean filtering criteria comprise at least one of: a presence of a tag, an absence of a tag, a timestamp range, a geographic location being inside or outside of a geographic region, or a numerical range.

In Example 83, the subject matter of Examples 80-82 includes, wherein the Boolean filtering criteria comprise a Boolean expression combining two or more criteria.

In Example 84, the subject matter of Examples 80-83 includes, wherein the multiple search components comprise at least one of: a text-based criterion, a classifier-based criterion, or a similarity criterion to an input image.

In Example 85, the subject matter of Examples 80-84 includes, determining the number of filtering search results by searching a relational database according to the Boolean filtering criteria.

In Example 86, the subject matter of Example 85 includes, wherein the relational database and the vector database store a common dataset.

Example 87 is a computer-readable medium storing instructions operable to cause one or more processors to perform operations comprising: receiving, from a client device, an image search query comprising multiple search components; mapping each of the multiple search components to a component embedding vector to generate multiple component embedding vectors; mathematically combining the multiple component embedding vectors to generate multiple query vectors with different mathematical combinations; identifying, for each of the different mathematical combinations, from a vector database storing representations of images, a set of image search results based on a similarity score of a query vector of the multiple query vectors and an image embedding vector for an image of the images; and transmitting, to the client device, a portion of the set of image search results.

In Example 88, the subject matter of Example 87 includes, wherein the similarity score comprises a dot product.

In Example 89, the subject matter of Examples 87-88 includes, wherein the vector database stores representations of images mapped to a vector space.

In Example 90, the subject matter of Examples 87-89 includes, wherein at least a portion of the mathematical combinations are determined based on the set of image search results.

In Example 91, the subject matter of Examples 87-90 includes, wherein mathematically combining the multiple component embedding vectors comprises adding the multiple component embedding vectors.

In Example 92, the subject matter of Examples 87-91 includes, wherein mathematically combining the multiple component embedding vectors comprises weighted addition of the multiple component embedding vectors.

In Example 93, the subject matter of Examples 87-92 includes, wherein at least one of the multiple search components comprises natural language text from the image search query.

In Example 94, the subject matter of Examples 87-93 includes, wherein the set of image search results comprises the image for which the similarity score of the query vector and the image embedding vector for the image exceeds a threshold.

In Example 95, the subject matter of Examples 87-94 includes, wherein the set of image search results comprises multiple images, wherein, for each image of the multiple images, the similarity score of the query vector and the image embedding vector for the image exceeds a threshold.

In Example 96, the subject matter of Examples 87-95 includes, wherein the set of image search results comprises n images having n highest values, from among images of the vector database, of the similarity score of the query vector and the image embedding vector for each image, wherein n is a positive integer.

In Example 97, the subject matter of Examples 87-96 includes, wherein the image search query is received via a graphical user interface for specifying the multiple search components.

In Example 98, the subject matter of Examples 87-97 includes, the operations further comprising: computing, for each image from at least a subset of image in the images search results, a product of probabilities that the image is associated with each of the multiple search components; and identifying the portion of the set of image search results based on the product of probabilities.

In Example 99, the subject matter of Examples 87-98 includes, wherein the image search query comprises Boolean filtering criteria and the multiple search components, wherein identifying the set of image search results comprises: if a number of filtering search results, determined using the Boolean filtering criteria, is in a range: transmitting, to the client device in response to the image search query, a subset of the filtering search results based on the multiple search components; or if the number of filtering search results is out of the range: obtaining, using a vector database, a set of probabilistic search results according to the multiple search components; filtering the set of probabilistic search results according to the Boolean filtering criteria; and transmitting, to the client device in response to the image search query, at least a subset of the filtered set of probabilistic search results.

In Example 100, the subject matter of Example 99 includes, wherein being in the range comprises being below a threshold.

In Example 101, the subject matter of Examples 99-100 includes, wherein the Boolean filtering criteria comprise at least one of: a presence of a tag, an absence of a tag, a timestamp range, a geographic location being inside or outside of a geographic region, or a numerical range.

In Example 102, the subject matter of Examples 99-101 includes, wherein the Boolean filtering criteria comprise a Boolean expression combining two or more criteria.

In Example 103, the subject matter of Examples 99-102 includes, wherein the multiple search components comprise at least one of: a text-based criterion, a classifier-based criterion, or a similarity criterion to an input image.

In Example 104, the subject matter of Examples 99-103 includes, the operations further comprising: determining the number of filtering search results by searching a relational database according to the Boolean filtering criteria.

In Example 105, the subject matter of Example 104 includes, wherein the relational database and the vector database store a common dataset.

Example 106 is a system, comprising: a memory subsystem; and processing circuitry configured to execute instructions stored in the memory subsystem to perform operations comprising: receiving, from a client device, an image search query comprising multiple search components; mapping each of the multiple search components to a component embedding vector to generate multiple component embedding vectors; mathematically combining the multiple component embedding vectors to generate multiple query vectors with different mathematical combinations; identifying, for each of the different mathematical combinations, from a vector database storing representations of images, a set of image search results based on a similarity score of a query vector of the multiple query vectors and an image embedding vector for an image of the images; and transmitting, to the client device, a portion of the set of image search results.

In Example 107, the subject matter of Example 106 includes, wherein the similarity score comprises a dot product.

In Example 108, the subject matter of Examples 106-107 includes, wherein the vector database stores representations of images mapped to a vector space.

In Example 109, the subject matter of Examples 106-108 includes, wherein at least a portion of the mathematical combinations are determined based on the set of image search results.

In Example 110, the subject matter of Examples 106-109 includes, wherein mathematically combining the multiple component embedding vectors comprises adding the multiple component embedding vectors.

In Example 111, the subject matter of Examples 106-110 includes, wherein mathematically combining the multiple component embedding vectors comprises weighted addition of the multiple component embedding vectors.

In Example 112, the subject matter of Examples 106-111 includes, wherein at least one of the multiple search components comprises natural language text from the image search query.

In Example 113, the subject matter of Examples 106-112 includes, wherein the set of image search results comprises the image for which the similarity score of the query vector and the image embedding vector for the image exceeds a threshold.

In Example 114, the subject matter of Examples 106-113 includes, wherein the set of image search results comprises multiple images, wherein, for each image of the multiple images, the similarity score of the query vector and the image embedding vector for the image exceeds a threshold.

In Example 115, the subject matter of Examples 106-114 includes, wherein the set of image search results comprises n images having n highest values, from among images of the vector database, of the similarity score of the query vector and the image embedding vector for each image, wherein n is a positive integer.

In Example 116, the subject matter of Examples 106-115 includes, wherein the image search query is received via a graphical user interface for specifying the multiple search components.

In Example 117, the subject matter of Examples 106-116 includes, the operations further comprising: computing, for each image from at least a subset of image in the images search results, a product of probabilities that the image is associated with each of the multiple search components; and identifying the portion of the set of image search results based on the product of probabilities.

In Example 118, the subject matter of Examples 106-117 includes, wherein the image search query comprises Boolean filtering criteria and the multiple search components, wherein identifying the set of image search results comprises: if a number of filtering search results, determined using the Boolean filtering criteria, is in a range: transmitting, to the client device in response to the image search query, a subset of the filtering search results based on the multiple search components; or if the number of filtering search results is out of the range: obtaining, using a vector database, a set of probabilistic search results according to the multiple search components; filtering the set of probabilistic search results according to the Boolean filtering criteria; and transmitting, to the client device in response to the image search query, at least a subset of the filtered set of probabilistic search results.

In Example 119, the subject matter of Example 118 includes, wherein being in the range comprises being below a threshold.

In Example 120, the subject matter of Examples 118-119 includes, wherein the Boolean filtering criteria comprise at least one of: a presence of a tag, an absence of a tag, a timestamp range, a geographic location being inside or outside of a geographic region, or a numerical range.

In Example 121, the subject matter of Examples 118-120 includes, wherein the Boolean filtering criteria comprise a Boolean expression combining two or more criteria.

In Example 122, the subject matter of Examples 118-121 includes, wherein the multiple search components comprise at least one of: a text-based criterion, a classifier-based criterion, or a similarity criterion to an input image.

In Example 123, the subject matter of Examples 118-122 includes, the operations further comprising: determining the number of filtering search results by searching a relational database according to the Boolean filtering criteria.

In Example 124, the subject matter of Example 123 includes, wherein the relational database and the vector database store a common dataset.

Example 125 is at least one apparatus comprising: means for receiving, from a client device, an image search query comprising multiple search components; means for mapping each of the multiple search components to a component embedding vector to generate multiple component embedding vectors; means for mathematically combining the multiple component embedding vectors to generate multiple query vectors with different mathematical combinations; means for identifying, for each of the different mathematical combinations, from a vector database storing representations of images, a set of image search results based on a similarity score of a query vector of the multiple query vectors and an image embedding vector for an image of the images; and means for transmitting, to the client device, a portion of the set of image search results.

Example 126 is a method for image search, the method comprising: receiving, from a client device, an image search query comprising multiple search components; mapping at least a subset of the multiple search components to a component embedding vector to generate multiple component embedding vectors; combining the multiple component embedding vectors to generate multiple query vectors with different combinations; generating multiple query vectors that comprise multiple combinations of the multiple component embedding vectors; selecting one or more of the multiple query vectors; identifying one or more images associated with image embedding vectors stored in a data repository based on a comparison of the image embedding vectors with at least one of the multiple query vectors; and transmitting, to the client device, information to cause display, at the client device, of at least one of the one or more images.

In Example 127, the subject matter of Example 126 includes, wherein the comparison of the image embedding vectors with the at least one of the multiple query vectors comprises a calculation of a similarity score between the at least one of the multiple query vectors and at least one of the image embedding vectors, and wherein identifying the one or more images comprises selecting images having a similarity score exceeding a threshold value.

In Example 128, the subject matter of Examples 126-127 includes, wherein combining the multiple component embedding vectors comprises performing a weighted addition of the multiple component embedding vectors, wherein different weights are applied to different component embedding vectors.

In Example 129, the subject matter of Examples 126-128 includes, wherein the image search query comprises Boolean filtering criteria, the method further comprising: determining a number of filtering search results that satisfy the Boolean filtering criteria.

In Example 130, the subject matter of Example 129 includes, when the number of filtering search results is below a threshold, applying the multiple search components to the filtering search results to identify the one or more images.

In Example 131, the subject matter of Examples 129-130 includes, when the number of filtering search results exceeds a threshold, obtaining a set of search results based on the multiple query vectors and filtering the set of search results according to the Boolean filtering criteria to identify the one or more images.

In Example 132, the subject matter of Examples 129-131 includes, wherein the Boolean filtering criteria comprise at least one of: a presence of a tag, an absence of a tag, a timestamp range, a geographic location being inside or outside a geographic region, or a numerical range.

In Example 133, the subject matter of Examples 126-132 includes, wherein the multiple search components comprise a text-based criterion, and wherein mapping at least the subset of the multiple search components comprises: mapping the text-based criterion to a first component embedding vector using a text embedding model.

In Example 134, the subject matter of Examples 126-133 includes, wherein the multiple search components comprise a classifier-based criterion, and wherein mapping at least the subset of the multiple search components comprises: mapping the classifier-based criterion to a first component embedding vector using an embedding-based classifier.

In Example 135, the subject matter of Examples 126-134 includes, wherein the multiple search components comprise a similarity criterion to an input image, and wherein mapping at least the subset of the multiple search components comprises: mapping the input image to a first component embedding vector using an image embedding model.

In Example 136, the subject matter of Examples 126-135 includes, computing, for each image of the one or more images, a product of probabilities that the image is associated with each of the multiple search components; and ranking the one or more images based on the product of probabilities to determine an order for displaying the one or more images at the client device.

In Example 137, the subject matter of Examples 126-136 includes, wherein the data repository comprises a vector database that stores the image embedding vectors and a relational database that stores metadata associated with the one or more images, the method further comprising: accessing both the vector database and the relational database to identify the one or more images.

In Example 138, the subject matter of Examples 126-137 includes, receiving, from the client device, an indication of a selected image of the one or more images; generating a refined set of query vectors based on an image embedding vector associated with the selected image; and identifying additional images based on a comparison between the image embedding vectors stored in the data repository and the refined set of query vectors.

Example 139 is a non-transitory computer-readable medium storing instructions operable to cause one or more processors to perform operations comprising: receiving an image search query comprising multiple search components; mapping at least a subset of the multiple search components to a component embedding vector to generate multiple component embedding vectors; combining the multiple component embedding vectors to generate multiple query vectors with different combinations; generating multiple query vectors that comprise multiple combinations of the multiple component embedding vectors; selecting one or more of the multiple query vectors; identifying one or more images associated with image embedding vectors stored in a data repository based on a comparison of the image embedding vectors with at least one of the selected one or more of the multiple query vectors; and transmitting information to cause display of at least one of the one or more images.

In Example 140, the subject matter of Example 139 includes, wherein the comparison of the image embedding vectors with the at least one of the multiple query vectors comprises a calculation of a similarity score between the at least one of the multiple query vectors and at least one of the image embedding vectors, and wherein identifying the one or more images comprises selecting images having a similarity score exceeding a threshold value.

In Example 141, the subject matter of Examples 139-140 includes, wherein combining the multiple component embedding vectors comprises performing a weighted addition of the multiple component embedding vectors, wherein different weights are applied to different component embedding vectors.

In Example 142, the subject matter of Examples 139-141 includes, wherein the image search query comprises Boolean filtering criteria, the operations further comprising: determining a number of filtering search results that satisfy the Boolean filtering criteria.

Example 143 is a system comprising: a memory subsystem storing instructions; and processing circuitry configured to execute the instructions to perform operations comprising: receiving, from a client device, a search query comprising multiple search components; mapping at least a subset of the multiple search components to a component embedding vector to generate multiple component embedding vectors; combining the multiple component embedding vectors to generate multiple query vectors with different combinations; generating multiple query vectors that comprise multiple combinations of the multiple component embedding vectors; selecting one or more of the multiple query vectors; identifying one or more entries associated with entry embedding vectors stored in a data repository based on a comparison of the entry embedding vectors with at least one of the multiple query vectors; and transmitting, to the client device, information to cause display, at the client device, of at least one of the one or more entries.

In Example 144, the subject matter of Example 143 includes, wherein the one or more entries comprise one or more images, and wherein the entry embedding vectors comprise image embedding vectors.

In Example 145, the subject matter of Examples 143-144 includes, wherein the multiple search components comprise a classifier-based criterion, and wherein mapping at least the subset of the multiple search components comprises: mapping the classifier-based criterion to a first component embedding vector using an embedding-based classifier.

Example 146 is at least one machine-readable medium including instructions that, when executed by processing circuitry, cause the processing circuitry to perform operations to implement of any of Examples 1-145.

Example 147 is an apparatus comprising means to implement of any of Examples 1-145.

Example 148 is a system to implement of any of Examples 1-145.

Example 149 is a method to implement of any of Examples 1-145.

As used herein, unless explicitly stated otherwise, any term specified in the singular may include its plural version. For example, "a computer that stores data and runs software," may include a single computer that stores data and runs software or two computers-a first computer that stores data and a second computer that runs software. Also "a computer that stores data and runs software," may include multiple computers that together stored data and run software. At least one of the multiple computers stores data, and at least one of the multiple computers runs software.

As used herein, the term "computer-readable medium" encompasses one or more computer-readable media. A computer-readable medium may include any storage unit (or multiple storage units) that store data or instructions that are readable by processing circuitry. A computer-readable medium may include, for example, at least one of a data repository, a data storage unit, a computer memory, a hard drive, a disk, or a random access memory. A computer-readable medium may include a single computer-readable medium or multiple computer-readable media. A computer-readable medium may be a transitory computer-readable medium or a non-transitory computer-readable medium.

As used herein, the term "memory subsystem" includes one or more memories, where each memory may be a computer-readable medium. A memory subsystem may encompass memory hardware units (e.g., a hard drive or a disk) that store data or instructions in software form. Alternatively or in addition, the memory subsystem may include data or instructions that are hard-wired into processing circuitry. The memory subsystem may include a single memory unit or multiple joint or disjoint memory units, which each of the multiple joint or disjoint memory units storing all or a portion of the data described as being stored in the memory subsystem.

As used herein, processing circuitry includes one or more processors. The one or more processors may be arranged in one or more processing units, for example, a central processing unit (CPU), a graphics processing unit (GPU), or a combination of at least one of a CPU or a GPU.

As used herein, the term "engine" may include software, hardware, or a combination of software and hardware. An engine may be implemented using software stored in the memory subsystem. Alternatively, an engine may be hard-wired into processing circuitry. In some cases, an engine includes a combination of software stored in the memory subsystem and hardware that is hard-wired into the processing circuitry.

As used herein, the term "and/or" encompasses its plain and ordinary meaning and may refer to an intersection or a union of sets of data. For example, the phrase "A and/or B" encompasses the union of A and B. The phrase "A and/or B" encompasses the intersection of A and B.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, user equipment (UE), article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method for image search, the method comprising:
receiving, from a client device, an image search query comprising multiple search components;

mapping at least a subset of the multiple search components to a component embedding vector to generate multiple component embedding vectors;
combining the multiple component embedding vectors to generate multiple query vectors with different combinations, wherein combining the multiple component embedding vectors comprises mathematically combining the multiple component embedding vectors by calculating sums or weighted sums using different weights;
in response to generation of the multiple query vectors with the different combinations, selecting one or more of the multiple query vectors;
identifying one or more images associated with image embedding vectors stored in a vector database based on a comparison of the image embedding vectors with at least one of the multiple query vectors, wherein the comparison comprises a similarity score of the image embedding vectors and the at least one of the multiple query vectors; and
transmitting, to the client device, information to cause display, at the client device, of at least one of the one or more images.

2. The method of claim 1, wherein the comparison of the image embedding vectors with the at least one of the multiple query vectors comprises a calculation of a similarity score between the at least one of the multiple query vectors and at least one of the image embedding vectors, and wherein identifying the one or more images comprises selecting images having a similarity score exceeding a threshold value.

3. The method of claim 1, wherein combining the multiple component embedding vectors comprises performing a weighted addition of the multiple component embedding vectors, wherein different weights are applied to different component embedding vectors.

4. The method of claim 1, wherein the image search query comprises Boolean filtering criteria, the method further comprising:
determining a number of filtering search results that satisfy the Boolean filtering criteria.

5. The method of claim 4, further comprising:
when the number of filtering search results is below a threshold, applying the multiple search components to the filtering search results to identify the one or more images.

6. The method of claim 4, further comprising:
when the number of filtering search results exceeds a threshold, obtaining a set of search results based on the multiple query vectors and filtering the set of search results according to the Boolean filtering criteria to identify the one or more images.

7. The method of claim 4, wherein the Boolean filtering criteria comprise at least one of: a presence of a tag, an absence of a tag, a timestamp range, a geographic location being inside or outside a geographic region, or a numerical range.

8. The method of claim 1, wherein the multiple search components comprise a text-based criterion, and wherein mapping at least the subset of the multiple search components comprises:
mapping the text-based criterion to a first component embedding vector using a text embedding model.

9. The method of claim 1, wherein the multiple search components comprise a classifier-based criterion, and wherein mapping at least the subset of the multiple search components comprises:

mapping the classifier-based criterion to a first component embedding vector using an embedding-based classifier.

10. The method of claim 1, wherein the multiple search components comprise a similarity criterion to an input image, and wherein mapping at least the subset of the multiple search components comprises:

mapping the input image to a first component embedding vector using an image embedding model.

11. The method of claim 1, further comprising:

computing, for each image of the one or more images, a product of probabilities that the image is associated with each of the multiple search components; and ranking the one or more images based on the product of probabilities to determine an order for displaying the one or more images at the client device.

12. The method of claim 1, wherein the vector database stores the image embedding vectors and a relational database that stores metadata associated with the one or more images, the method further comprising:

accessing both the vector database and the relational database to identify the one or more images.

13. The method of claim 1, further comprising:

receiving, from the client device, an indication of a selected image of the one or more images;

generating a refined set of query vectors based on an image embedding vector associated with the selected image; and identifying additional images based on a comparison between the image embedding vectors stored in the vector database and the refined set of query vectors.

14. A non-transitory computer-readable medium storing instructions operable to cause one or more processors to perform operations comprising:

receiving an image search query comprising multiple search components;

mapping at least a subset of the multiple search components to a component embedding vector to generate multiple component embedding vectors;

combining the multiple component embedding vectors to generate multiple query vectors with different combinations, wherein combining the multiple component embedding vectors comprises mathematically combining the multiple component embedding vectors by calculating sums or weighted sums using different weights;

in response to generation of the multiple query vectors with the different combinations, selecting one or more of the multiple query vectors;

identifying one or more images associated with image embedding vectors stored in a vector database based on a comparison of the image embedding vectors with at least one of the selected one or more of the multiple query vectors, wherein the comparison comprises a similarity score of the image embedding vectors and the at least one of the multiple query vectors; and transmitting information to cause display of at least one of the one or more images.

15. The non-transitory computer-readable medium of claim 14, wherein the comparison of the image embedding vectors with the at least one of the multiple query vectors comprises a calculation of a similarity score between the at least one of the multiple query vectors and at least one of the image embedding vectors, and wherein identifying the one or more images comprises selecting images having a similarity score exceeding a threshold value.

16. The non-transitory computer-readable medium of claim 14, wherein combining the multiple component embedding vectors comprises performing a weighted addition of the multiple component embedding vectors, wherein different weights are applied to different component embedding vectors.

17. The non-transitory computer-readable medium of claim 14, wherein the image search query comprises Boolean filtering criteria, the operations further comprising:

determining a number of filtering search results that satisfy the Boolean filtering criteria.

18. A system comprising:

a memory subsystem storing instructions; and processing circuitry configured to execute the instructions to perform operations comprising:

receiving, from a client device, a search query comprising multiple search components;

mapping at least a subset of the multiple search components to a component embedding vector to generate multiple component embedding vectors;

combining the multiple component embedding vectors to generate multiple query vectors with different combinations, wherein combining the multiple component embedding vectors comprises mathematically combining the multiple component embedding vectors by calculating sums or weighted sums using different weights;

in response to generation of the multiple query vectors with the different combinations, selecting one or more of the multiple query vectors;

identifying one or more entries associated with entry embedding vectors stored in a vector database based on a comparison of the entry embedding vectors with at least one of the multiple query vectors, wherein the comparison comprises a similarity score of the entry embedding vectors and the at least one of the multiple query vectors; and transmitting, to the client device, information to cause display, at the client device, of at least one of the one or more entries.

19. The system of claim 18, wherein the one or more entries comprise one or more images, and wherein the entry embedding vectors comprise image embedding vectors.

20. The system of claim 18, wherein the multiple search components comprise a classifier-based criterion, and wherein mapping at least the subset of the multiple search components comprises:

mapping the classifier-based criterion to a first component embedding vector using an embedding-based classifier.

* * * * *